United States Patent
Jang et al.

(10) Patent No.: US 11,844,137 B2
(45) Date of Patent: *Dec. 12, 2023

(54) METHOD AND APPARATUS FOR RETRANSMITTING UPLINK DATA CONFIGURED IN DISCONTINUOUS RECEPTION IN A WIRELESS COMMUNICATION SYSTEM

(71) Applicant: Samsung Electronics Co., Ltd., Suwon-si (KR)

(72) Inventors: Jaehyuk Jang, Suwon-si (KR); Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,860

(22) Filed: Feb. 10, 2021

(65) Prior Publication Data

US 2021/0168900 A1 Jun. 3, 2021

Related U.S. Application Data

(63) Continuation of application No. 16/283,484, filed on Feb. 22, 2019, now Pat. No. 10,925,108.

(30) Foreign Application Priority Data

Feb. 23, 2018 (KR) .......................... 10-2018-0021658

(51) Int. Cl.
*H04W 76/15* (2018.01)
*H04L 5/00* (2006.01)
(Continued)

(52) U.S. Cl.
CPC .......... *H04W 76/28* (2018.02); *H04L 5/0098* (2013.01); *H04W 56/0045* (2013.01); *H04W 72/12* (2013.01); *H04W 76/15* (2018.02)

(58) Field of Classification Search
CPC .. H04L 5/0091–0098; H04W 56/0015; H04W 56/0045
See application file for complete search history.

(56) References Cited

U.S. PATENT DOCUMENTS

| 2016/0219547 A1 | 7/2016 | Seo et al. |
| 2017/0150440 A1 | 5/2017 | Cave et al. |

(Continued)

FOREIGN PATENT DOCUMENTS

| CN | 105580457 A | 5/2016 |
| KR | 10-2018-0106623 A | 10/2018 |
| WO | 2016092953 A1 | 6/2016 |

OTHER PUBLICATIONS

European Patent Office, "Supplementary European Search Report" dated Feb. 24, 2021, in connection with European Patent Application No. 19757780.2, 10 pages.

(Continued)

*Primary Examiner* — Marcus Smith

(57) ABSTRACT

The disclosure relates to a communication technique for converging a 5G communication system, which is provided to support a higher data transmission rate beyond a 4G system with an IoT technology, and a system therefor. The disclosure may be applied to intelligent services (e.g., smart home, smart building, smart city, smart car or connected car, health care, digital education, retail business, security and safety related service, or the like) based on the 5G communication technology and the IoT related technology. The embodiment of the disclosure relates to an uplink data retransmission method. In addition, the embodiment of the (Continued)

disclosure relates to a method for adjusting time synchronization of an uplink.

16 Claims, 19 Drawing Sheets

(51) Int. Cl.
*H04W 72/12* (2023.01)
*H04W 56/00* (2009.01)
*H04W 76/28* (2018.01)

(56) References Cited

U.S. PATENT DOCUMENTS

| | | | |
|---|---|---|---|
| 2017/0202054 | A1 | 7/2017 | Rathonyi et al. |
| 2017/0373803 | A1 | 12/2017 | Wu |
| 2018/0110085 | A1 | 4/2018 | Tseng |
| 2018/0279204 | A1 | 9/2018 | Kim et al. |
| 2019/0150173 | A1 | 5/2019 | Lee et al. |
| 2019/0199503 | A1 | 6/2019 | Son |
| 2019/0215861 | A1* | 7/2019 | Son ............... H04W 56/0045 |
| 2019/0254073 | A1 | 8/2019 | Sheng et al. |
| 2019/0261234 | A1 | 8/2019 | Park et al. |
| 2019/0364602 | A1 | 11/2019 | Yi et al. |
| 2020/0245278 | A1 | 7/2020 | Niu et al. |
| 2020/0337011 | A1* | 10/2020 | Jiang ............... H04W 56/0015 |

OTHER PUBLICATIONS

Ericsson, "Even Further Analysis of UE Initial Transmit Timing Requirement", 3GPP TSG RAN WG4 Meeting #85, R4-1713648, Reno, USA, Nov. 27-Dec. 1, 2017, 7 pages.
Ericsson, "TA Offset for TDD LTE-NR coexistence", 3GPP TSG-RAN WG4 Meeting #86, R4-1802750, Athens, Greece; Feb. 26-Mar. 2, 2018, 3 pages.
Ericsson, "TP to TS 38.133 v0.3.0: UE Timing Offset Requirements", 3GPP TSG RAN WG4 Meeting #85, R4-1802750, Reno, USA, Nov. 27-Dec. 1, 2017, 2 pages.
ISA/KR, International Search Report and Written Opinion of the International Search Authority, International Application No. PCT/KR2019/002131, dated May 28, 2019, 9 pages.
Huawei et al., "Bandwidth part activation and adaptation," R1-1719828, 3GPP TSG RAN WG1 Meeting #91, Reno, USA, Nov. 27-Dec. 1, 2017, 6 pages.
Huawei et al., "Discussion on remaining issues for SUL and EN-DC," R1-1801350, 3GPP TSG RAN WG1 Meeting #92, Athens, Greece, Feb. 26-Mar. 2, 2018, 5 pages.
Huawei et al., "Further discussion on RRM impact on uplink sharing," R4-1713423, 3GPP TSG-RAN WG4 Meeting #85, Reno, USA, Nov. 27-Dec. 1, 2017, 7 pages.
Huawei, et al., "TP on TA-offset for SUL," R1-1802712, 3GPP TSG RAN WG1 Meeting #92, Athens, Greece, Feb. 26-Mar. 2, 2018, 2 pages.
Vivo, "Remaining issues on RACH procedure and timing advance," R1-1801511, 3GPP TSG RAN WG1 Meeting #92, Greece, Athens, Feb. 26-Mar. 2, 2018, 3 pages.
Office Action dated Dec. 15, 2022, in connection with Korean Application No. 10-2018-0021658, 8 pages.
Ericsson, "TA Offset for TDD LTE-NR coexistence," 3GPP TSG-RAN WG4 Meeting #86, R4-1802751, Athens, Greece; Feb. 26-Mar. 2, 2018, 3 pages.
Huawei, et al., "CR on 38.331 for support for SUL (ASN.1 H017, H018, H021, H038, H208)," R2-1800749, 3GPP TSG-RAN WG2 NR Ad hoc 1801, Vancouver, Canada, Jan. 22-26, 2018, 15 pages.
European Patent Office, "Communication pursuant to Article 94(3) EPC," dated Mar. 1, 2023 in connection with European Application No. 19757780.2, 7 pages.
China National Intellectual Property Administration, "The First Office Action," dated Jul. 10, 2023, in connection with Chinese Patent Application No. 201980015139.4, 18 pages.
Office Action dated Sep. 20, 2023, in connection with U.S. Appl. No. 17/810,534, 11 pages.

\* cited by examiner

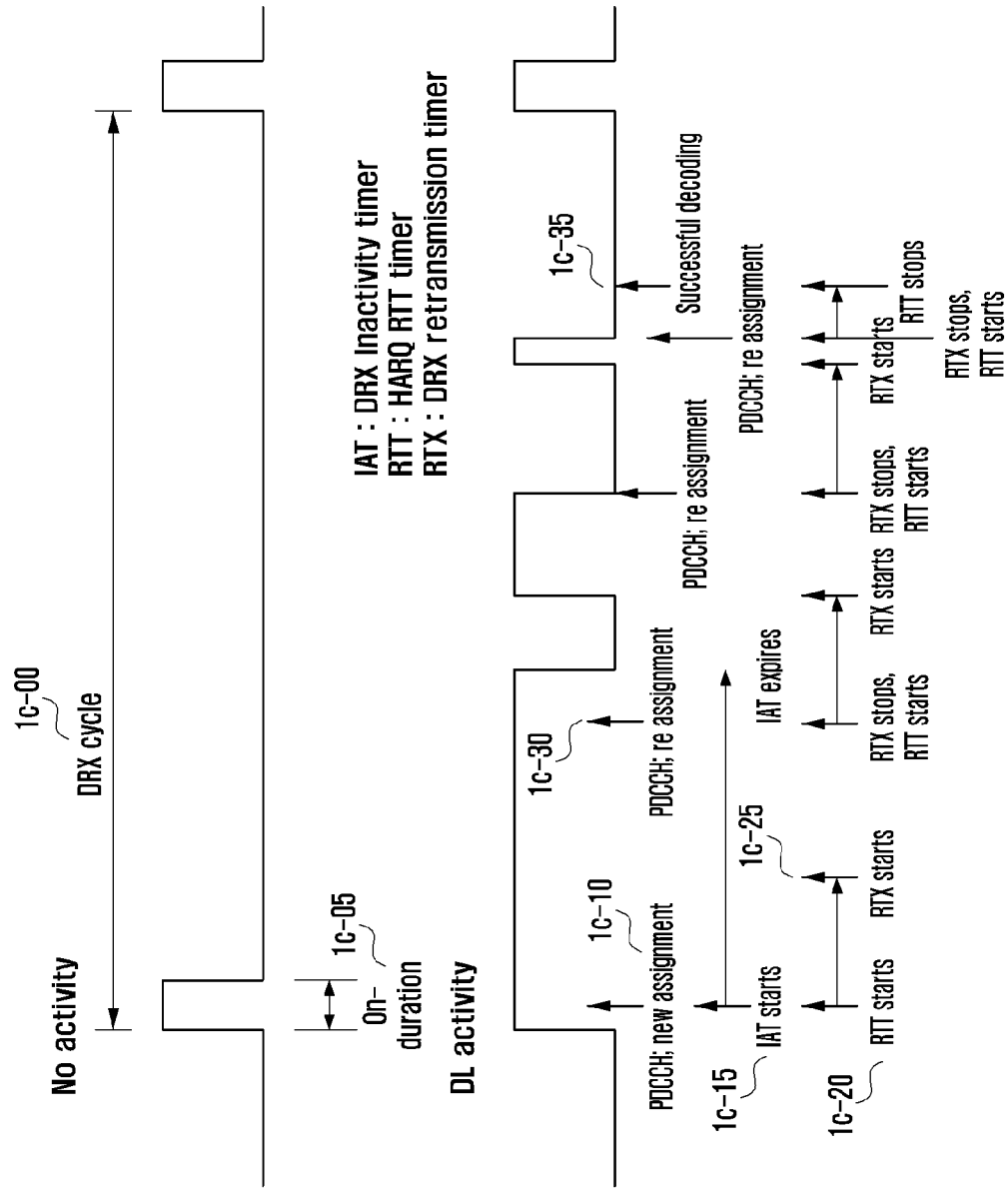

(a)

(b)

(c)

(a)

(b)

METHOD AND APPARATUS FOR RETRANSMITTING UPLINK DATA CONFIGURED IN DISCONTINUOUS RECEPTION IN A WIRELESS COMMUNICATION SYSTEM

CROSS-REFERENCE TO RELATED APPLICATION

This application is a continuation of application Ser. No. 16/283,484, filed Feb. 22, 2019, now U.S. Pat. No. 10,925,108, which is based on and claims priority under 35 U.S.C. § 119(a) of a Korean patent application number 10-2018-0021658, filed on Feb. 23, 2018, in the Korean Intellectual Property Office, the disclosure of each of which is incorporated by reference herein in its entirety.

BACKGROUND

1. Field

Various embodiments of the disclosure relate to a method for performing an uplink transmission (grant) configured in a wireless communication system and a discontinuous reception (DRX) operation for reducing power consumption of a terminal.

In addition, the disclosure relates to a method for adjusting time synchronization of an uplink.

2. Description of Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band).

To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched.

In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, technologies such as the sensor network, the machine to machine (M2M), and the machine type communication (MTC), have been implemented by techniques such as the beamforming, the multiple input multiple output (MIMO), and the array antenna that are the 5G communication technologies. The application of the cloud radio access network (cloud RAN) as the big data processing technology described above may also be considered as an example of the fusing of the 5G communication technology with the IoT technology.

SUMMARY

The disclosure is directed to provision of a method for enabling a terminal to retransmit configured uplink at the time of simultaneously operating an uplink transmission (grant) configured in a wireless communication system and a discontinuous reception (DRX) operation for reducing power consumption of the terminal.

Further, the disclosure is directed to provision of a method for configuring a switching operation of a bandwidth part of an additional uplink and uplink synchronization when a bandwidth part of one downlink and a bandwidth part of two uplinks are activated simultaneously, in case of considering an additional uplink newly introduced in a next generation mobile communication system.

Objects of the disclosure are not limited to the above-mentioned objects. That is, other objects that are not mentioned may be obviously understood by those skilled in the art to which the disclosure pertains from the following description.

According to the embodiment of the disclosure, the terminal can monitor the signal from the base station only when the retransmission is required for the configured uplink, and can perform the uplink retransmission.

In addition, according to the embodiment of the disclosure, it is possible to clarify the ambiguity of the switching operation of the bandwidth parts which may occur according to the partial frequency band newly introduced in the next generation mobile communication system and the additional uplink, that is, how to perform the switching operation of the bandwidth part in the case of the additional uplink, and embody the operation of the terminal by clarifying the method for configuring uplink synchronization according to the configuration of the additional uplink.

In accordance with an aspect of the disclosure, a method by a terminal in a wireless communication system is provided. The method includes receiving, from a base station, a system information block including information associated with a transmission timing for an uplink signal to be transmitted on a supplementary uplink (SUL) bandwidth part (BWP), determining the transmission timing for the uplink signal based on the information, and transmitting, to the base station, the uplink signal on the SUL BWP based on the determined transmission timing.

In accordance with an aspect of the disclosure, a method by a base station in a wireless communication system is provided. The method includes transmitting, to a terminal, a system information block including information associated with a transmission timing for an uplink signal to be transmitted on a supplementary uplink (SUL) bandwidth part (BWP), and receiving, from the terminal, the uplink signal on the SUL BWP based on the transmission timing, wherein the transmission timing for the uplink signal is determined by the terminal based on the information.

In accordance with an aspect of the disclosure, a terminal in a wireless communication system is provided. The terminal includes a transceiver configured to transmit and receive signals, and a controller configured to receive, via the transceiver from a base station, a system information block including information associated with a transmission timing for an uplink signal to be transmitted on a supplementary uplink (SUL) bandwidth part (BWP), determine the transmission timing for the uplink signal based on the information, and transmit, via the transceiver to the base station, the uplink signal on the SUL BWP based on the determined transmission timing.

In accordance with an aspect of the disclosure, a base station in a wireless communication system is provided. The base station includes a transceiver configured to transmit and receive signals, and a controller configured to transmit, via the transceiver to a terminal, a system information block including information associated with a transmission timing for an uplink signal to be transmitted on a supplementary uplink (SUL) bandwidth part (BWP), and receive, via the transceiver from the terminal, the uplink signal on the SUL BWP based on the transmission timing, wherein the transmission timing for the uplink signal is determined by the terminal based on the information.

In accordance with an aspect of the disclosure, a method by a terminal in a wireless communication system is provided. The method includes receiving, from a base station, a message for configuring a discontinuous reception (DRX) operation, receiving, from the base station, data based on a semi-persistent scheduling (SPS) configuration, transmitting, to the base station, feedback information corresponding to the data and starting a hybrid automatic repeat and request (HARQ) round trip time (RTT) timer for a HARQ process corresponding to the data, after the end of a transmission of the feedback information.

In accordance with an aspect of the disclosure, a method by a terminal in a wireless communication system is provided. The method includes receiving, from a base station, a message for configuring a discontinuous reception (DRX) operation, transmitting, to the base station, a configured uplink grant based on a configured grant configuration and starting a hybrid automatic repeat and request (HARQ) round trip time (RTT) timer for a HARQ process corresponding to the configured uplink grant, after a first repetition of a transmission according to the configured grant configuration.

In accordance with an aspect of the disclosure, a method by a base station in a wireless communication system is provided. The method includes transmitting, to a terminal, a message for configuring a discontinuous reception (DRX) operation, transmitting, to the terminal, data based on a semi-persistent scheduling (SPS) configuration and receiving, from the terminal, feedback information corresponding to the data, wherein a hybrid automatic repeat and request (HARQ) round trip time (RTT) timer for a HARQ process corresponding to the data is started by the terminal, after the end of a transmission of the feedback information.

In accordance with an aspect of the disclosure, a method by a base station in a wireless communication system is provided. The method includes transmitting, to a terminal, a message for configuring a discontinuous reception (DRX) operation and receiving, from the terminal, a configured uplink grant based on a configured grant configuration, wherein a hybrid automatic repeat and request (HARQ) round trip time (RTT) timer for a HARQ process corresponding to the configured uplink grant is started by the terminal, after a first repetition of a transmission according to the configured grant configuration.

In accordance with an aspect of the disclosure, a terminal in a wireless communication system is provided. The terminal includes a transceiver configured to transmit and receive signals and a controller configured to receive, via the transceiver from a base station, a message for configuring a discontinuous reception (DRX) operation, receive, via the transceiver from the base station, data based on a semi-persistent scheduling (SPS) configuration, transmit, via the transceiver to the base station, feedback information corresponding to the data, and start a hybrid automatic repeat and request (HARQ) round trip time (RTT) timer for a HARQ process corresponding to the data, after the end of a transmission of the feedback information.

In accordance with an aspect of the disclosure, a terminal in a wireless communication system is provided. The terminal includes a transceiver configured to transmit and receive signals and a controller configured to receive, via the transceiver from a base station, a message for configuring a discontinuous reception (DRX) operation, transmit, via the transceiver to the base station, a configured uplink grant based on a configured grant configuration, and start a hybrid automatic repeat and request (HARQ) round trip time (RTT) timer for a HARQ process corresponding to the configured uplink grant, after a first repetition of a transmission according to the configured grant configuration.

In accordance with an aspect of the disclosure, a base station in a wireless communication system is provided. The base station includes a transceiver configured to transmit and receive signals and a controller configured to transmit, via the transceiver to a terminal, a message for configuring a discontinuous reception (DRX) operation, transmit, via the transceiver to the terminal, data based on a semi-persistent scheduling (SPS) configuration, and receive, via the transceiver from the terminal, feedback information corresponding to the data, wherein a hybrid automatic repeat and request (HARQ) round trip time (RTT) timer for a HARQ process corresponding to the data is started by the terminal, after the end of a transmission of the feedback information.

In accordance with an aspect of the disclosure, a base station in a wireless communication system is provided. The base station includes a transceiver configured to transmit and receive signals and a controller configured to transmit, via the transceiver to a terminal, a message for configuring a discontinuous reception (DRX) operation, and receive, via the transceiver from the terminal, a configured uplink grant based on a configured grant configuration, wherein a hybrid automatic repeat and request (HARQ) round trip time (RTT) timer for a HARQ process corresponding to the configured uplink grant is started by the terminal, after a first repetition of a transmission according to the configured grant configuration.

The effects that may be achieved by the embodiments of the disclosure are not limited to the above-mentioned objects. That is, other effects that are not mentioned may be obviously understood by those skilled in the art to which the disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1C illustrates a timing for performing a discontinuous reception operation to reduce power consumption of a terminal according to an embodiment of the disclosure.

DETAILED DESCRIPTION

FIGS. 1A through 2M, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the disclosure will be described in detail with reference to the accompanying drawings. Hereinafter, when it is determined that the detailed description of the known art related to the disclosure may obscure the gist of the disclosure, the detailed description thereof will be omitted. Further, the following terminologies are defined in consideration of the functions in the disclosure and may be construed in different ways by the intention or practice of users and operators. Therefore, the definitions thereof should be construed based on the contents throughout the specification.

Terms identifying an access node, terms indicating network entity, terms indicating messages, terms indicating an interface between network entities, terms indicating various types of identification information, and so on that are used in the following description are exemplified for convenience of explanation. Accordingly, the disclosure is not limited to terms to be described below and other terms indicating objects having the equivalent technical meaning may be used.

Hereafter, for convenience of explanation, the disclosure uses terms and names defined in the 3rd generation partnership project long term evolution (3GPP LTE) that is the latest standard among the currently communication standards. However, the disclosure is not limited to the terms and names but may also be identically applied even to the system according to other standards. In particular, the disclosure may be applied to 3GPP new radio (NR: 5G mobile communication standard).

First Embodiment

Figure 1A:
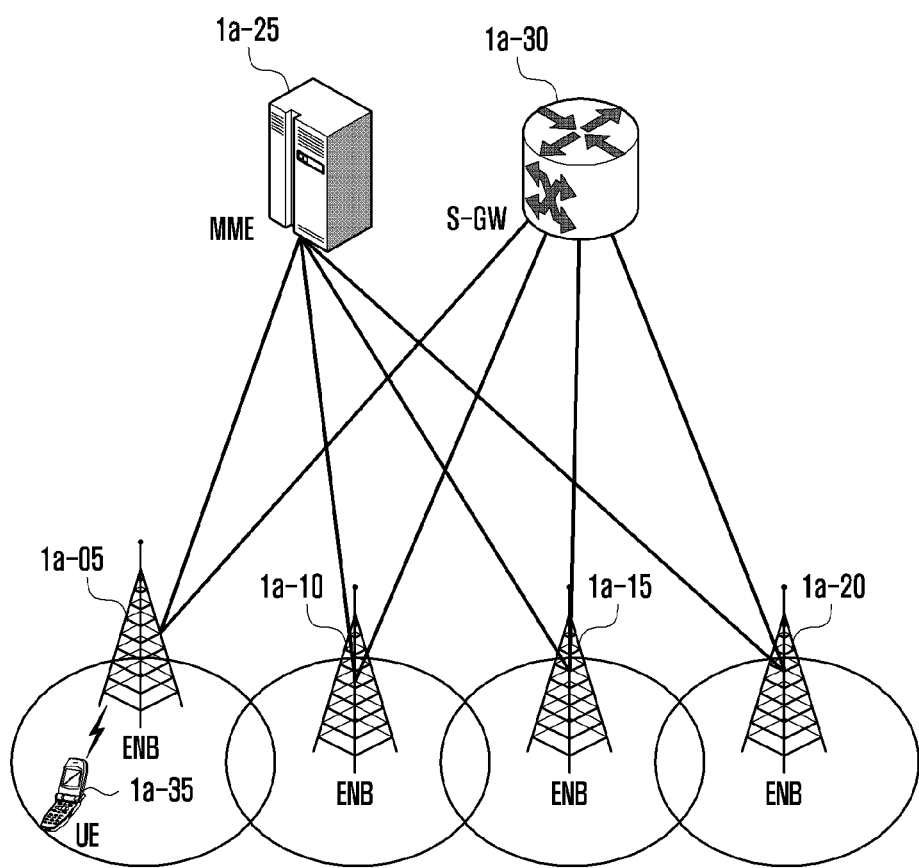
FIG. 1A illustrates a structure of an LTE system according to an embodiment of the disclosure.

FIG. 1A illustrates a structure of an LTE system according to an embodiment of the disclosure.

Referring to FIG. 1A, the wireless communication system is configured to include a plurality of base stations 1a-05, 1a-10, 1a-15, and 1a-20, a mobility management entity (MME) 1a-25, and a serving-gateway (S-GW) 1a-30. A user equipment (hereinafter, UE or terminal) 1a-35 accesses an external network via the base stations 1a-05, 1a-10, 1a-15, and 1a-20 and the S-GW 1a-30.

The base stations 1a-05, 1a-10, 1a-15, and 1a-20 are access nodes of a cellular network and provide a radio access to terminals that accesses a network. That is, in order to serve traffic of users, the base stations 1a-05, 1a-10, 1a-15, and 1a-20 collect and schedule status information such as a buffer status, an available transmission power status, a channel status of the terminals, thereby supporting a connection between the terminals and a core network (CN). The MME 1a-25 is an apparatus for performing various control functions as well as a mobility management functions for the terminal and is connected to a plurality of base stations, and the S-GW 1a-30 is an apparatus for providing a data bearer. Further, the MME 1a-25 and the S-GW 1a-30 may further perform authentication, bearer management, and the like on the terminal accessing the network and may process packets that are to be received from the base stations 1a-05, 1a-10, 1a-15, and 1a-20 and packets that are to be transmitted to the base stations 1a-05, 1a-10, 1a-15, and 1a-20.

Figure 1B:
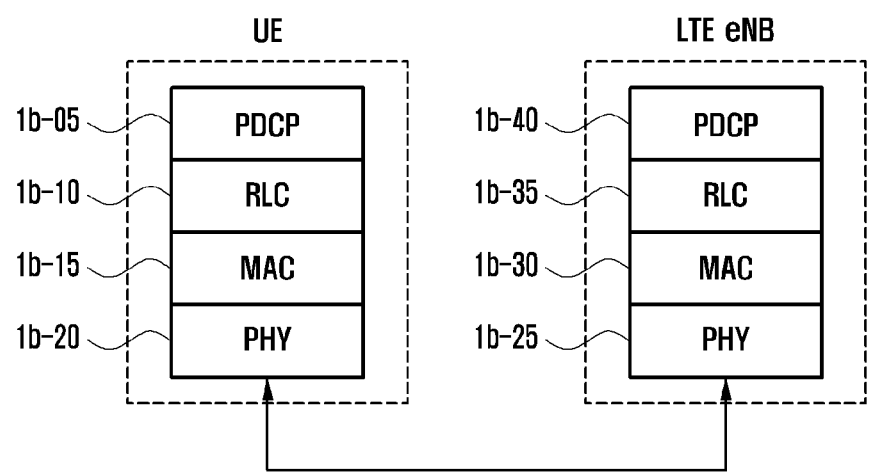
FIG. 1B illustrates a radio protocol structure in the LTE system according to an embodiment of the disclosure.

FIG. 1B illustrates a radio protocol structure in the LTE system according to an embodiment of the disclosure. The NR to be defined below may be partially different from the radio protocol structure in the figure, but will be described for convenience of explanation of the disclosure.

Referring to FIG. 1B, the radio protocol of the LTE system includes packet data convergence protocols (PDCPs) 1b-05 and 1b-40, radio link controls (RLCs) 1b-10 and 1b-35, and medium access controls (MACs) 1b-15 and 1b-30 in the terminal and the ENB, respectively.

The packet data convergence protocols (PDCPs) 1b-05 and 1b-40 performs operations such as compression/recovery of an IP header, and the radio link controls (hereinafter, referred to as RLC) 1b-10 and 1b-35 reconfigure a PDCP packet data unit (PDU) to be an appropriate size. The MACs 1b-15 and 1b-30 are connected to several RLC layer devices configured in one terminal and perform an operation of multiplexing RLC PDUs in an MAC PDU and demultiplexing the RLC PDUs from the MAC PDU. Physical layers 1b-20 and 1b-25 perform an operation of channel-coding and modulating upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Further, the physical layer uses an HARQ (Hybrid ARQ) for additional error correction and a receiving end transmits whether to receive the packet transmitted from a transmitting end as 1 bit. This is called HARQ ACK/NACK information. The downlink HARQ ACK/NACK information on the uplink transmission may be transmitted on a physical hybrid-ARQ indicator channel (PHICH) physical channel, and the uplink HARQ ACK/NACK information on the downlink transmission may be transmitted on a physical uplink control channel (PUCCH) or physical uplink shared channel (PUSCH) physical channel. The PUCCH is used to transmit not only for HARQ ACK/NACK information, but also downlink channel status information (CSI), a scheduling request (SR), and the like to the base station by the terminal. The SR is 1-bit information, and if the terminal transmits an SR to a resource in the PUCCH configured by the base station, the base station recognizes that the corresponding terminal has data to be transmitted to the uplink, and allocates an uplink resource. The terminal can transmit a detailed buffer status report (BSR) message as the uplink resource. The base station may allocate a plurality of SR resources to one terminal.

Meanwhile, the PHY layer may consist of one or a plurality of frequency/carriers, and a technology of simultaneously setting and using a plurality of frequencies in one base station is called carrier aggregation (hereinafter, referred to as CA) technology. Unlike using only one carrier for communication between the terminal (or user equipment (UE)) and the base station (E-UTRAN NodeB, eNB), the CA technology additionally uses a main carrier and one or a plurality of sub-carriers to be able to surprisingly increase throughput as many as the number of sub-carriers. Meanwhile, in the LTE, a cell within the base station using the main carrier is called a primary cell (PCell) and the sub-carrier is called a secondary cell (SCell).

The technology for extending the CA function to two base stations is referred to as dual connectivity (hereinafter, referred to as DC) technology. In the DC technology, the terminal simultaneously connects and uses a master base station (Master E-UTRAN Node B, hereinafter referred to as MeNB) and a secondary base station (Secondary E-UTRAN Node B, hereinafter referred to as SeNB), and cells belonging to the master base station are referred to as a master cell group (hereinafter, referred to as MCG) and cells belonging to the secondary base station are called a secondary cell group (hereinafter, referred to as SCG). There are representative cells for each cell group. The representative cell for the master cell group is referred to as a primary cell (hereinafter, referred to as PCell), and the representative cell for the secondary cell group is referred to as a primary secondary cell (hereinafter, referred to as PSCell). When the above-mentioned NR is used, the MCG uses the LTE technology, and the SCG uses the NR, such that the terminal may simultaneously use the LTE and the NR.

Although not illustrated in the drawings, each radio resource control (hereinafter, referred to as RRC) layer is present at an upper part of the PDCP layer of the terminal and the base station, and the RRC layer may receive and transmit access and measurement related configuration control messages for a radio resource control. For example, the terminal may be instructed to perform the measurement using the RRC layer message, and the terminal may report the measurement result to the base station using the RRC layer message.

Meanwhile, the transmission units of the PCell and the SCell may be the same or different. For example, in the LTE, the transmission units of PCell and SCell may be the same in 1 ms unit, but in the NR, the transmission unit (slot) in the PCell is 1 ms, but the transmission unit in the SCell can be 0.5 ms in length.

The following table shows information on the length of the slot available in each serving cell (that is, PCell or SCell) according to numerology (or subcarrier spacing) used by each serving cell in the NR.

TABLE 1

| information on the length of the slot | | | | | |
| --- | --- | --- | --- | --- | --- |
| Subcarrier spacing (kHz) | 15 | 30 | 60 | 120 | 240 |
| Length (ms) of transmission unit (slot) | 1 | 0.5 | 0.25 | 0.125 | 0.00625 |
| The number of slots in subframe (1 ms) | 1 | 2 | 4 | 8 | 12 |

In addition, in the LTE and NR, the following units are used in a frame structure in a radio interval (i.e. between the base station and the terminal).

Radio frame: has a length of 10 ms and is identified by a system frame number (SFN) for each radio frame.

Subframe: has a length of 1 ms, in which the radio frame has 10 subframes. The subframe is identified by subframe numbers 0 to 9 within each radio frame.

Slot: has a length according to a value set as shown in the table, and is a transmission unit used when the base station and the terminal transmit data.

FIG. 1C illustrates a discontinuous reception (hereinafter, referred to as DRX) operation of a terminal according to an embodiment of the disclosure.

The DRX is a technology of monitoring only some PDCCHs according to the above configuration information, instead of monitoring all physical downlink control channels (hereinafter, PDCCH below) to obtain scheduling information according to the configuration of the base station, thereby minimizing power consumption of the terminal. Accordingly, the terminal monitors the PDCCH only at the time called Active Time. The above Active Time means the time below: when drx-onDurationTimer or drx-InactiveTimer, drx-RetransmissionTimerDL, drx-RetransmissionTimerUL, or ra-ContentionResolutionTimer is activated; or when the above timer is still pended according to transmitting a scheduling request to the base station; or when a random access response (RAR) for a random access preamble that the terminal does not select directly is received and then PDCCH allocated to the C-RNTI of the terminal was not received from the base station.

The basic DRX operation has a DRX cycle 1c-00 and monitors the PDCCH only for an on-duration 1c-05 time. In the connection mode, the DRX cycle has two values of long DRX and short DRX. In general, the long DRX cycle is applied, and, if necessary, the base station can set the additional short DRX cycle. If both the long DRX cycle and the short DRX cycle are set, the terminal starts the short DRX timer and at the same time, repeats from the short DRX cycle, and if there is no new traffic until the short DRX timer expires, the terminal is changed from the short DRX cycle to the long DRX cycle.

If the scheduling information for a new packet is received by the PDCCH for the on-duration 1c-05 time (1c-10), the terminal starts a DRX inactivity timer 1c-15. The terminal maintains an active state during the DRX inactivity timer. That is, the PDCCH monitoring is continued.

In addition, the terminal also starts a HARQ RTT timer 1c-20. The HARQ RTT timer is applied to prevent the terminal from unnecessarily monitoring the PDCCH during HARQ round trip time (HARQ RTT), and the terminal does not need to perform the PDCCH monitoring during the timer operation time. However, while the DRX inactivity timer and the HARQ RTT timer are operated simultaneously, the terminal continues to monitor the PDCCH based on the DRX inactivity timer.

If the HARQ RTT timer expires, the DRX retransmission timer 1c-25 starts. While the DRX retransmission timer is operated, the terminal needs to perform the PDCCH monitoring for transmission/reception of the retransmission of the previous data. Generally, during the DRX retransmission timer operation, the scheduling information for HARQ retransmission is received (1c-30). Upon receiving the scheduling information, the terminal immediately stops the DRX retransmission timer and starts the HARQ RTT timer again. The above operation continues until the packet is successfully received (1c-35).

Figure 1D:
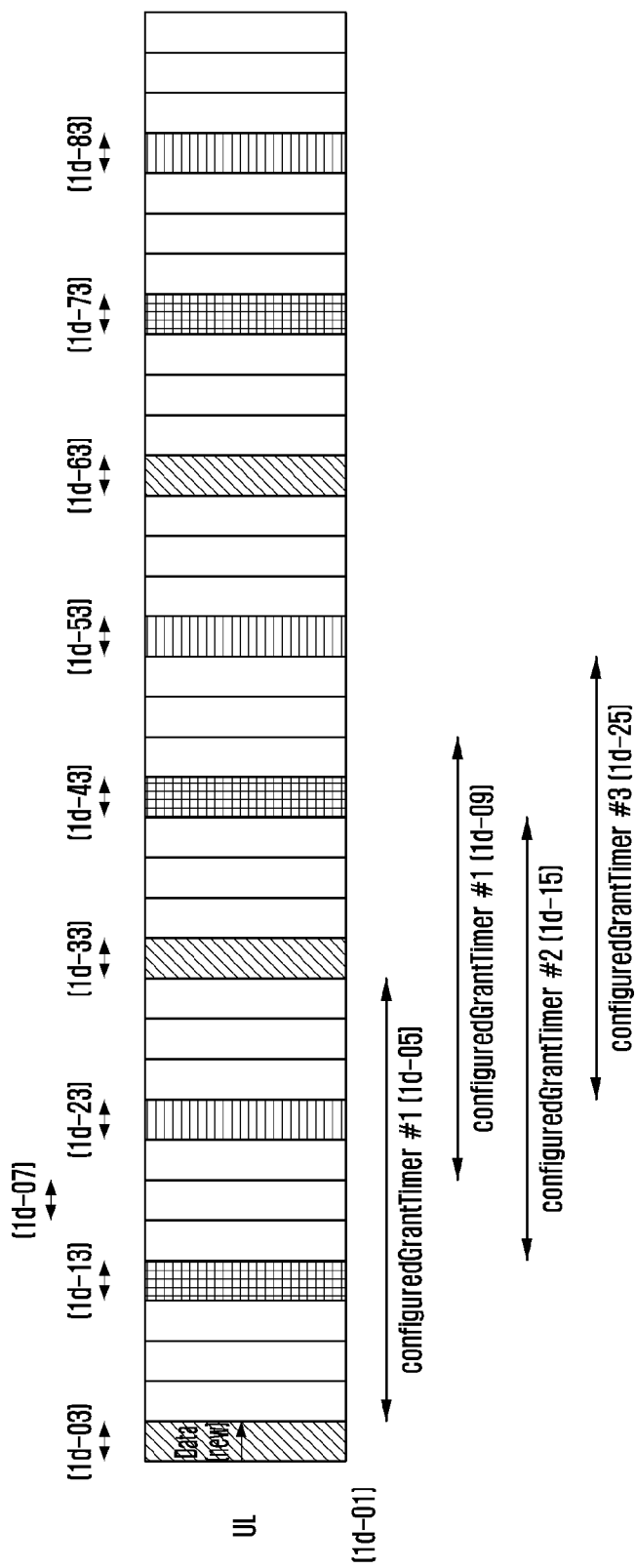
FIG. 1D illustrates a frame structure in which the terminal schematizes a data transmission in a configured uplink transmission according to an embodiment of the disclosure.

FIG. 1D illustrates a frame structure in which the terminal schematizes a data transmission in a configured uplink transmission according to an embodiment of the disclosure.

In general, in a cellular-based wireless communication system, in order for the terminal within the base station to transmit uplink data, the terminal receives signaling indicating an uplink resource allocation from the base station and transmits data to the allocated uplink resource. In the LTE, the signaling indicating the uplink resource allocation receives the corresponding information from a physical channel called a physical dedicated control channel (PDCCH), and the PDCCH includes physical uplink shared channel (PUSCH) resource information that can transmit data.

Meanwhile, in this exemplified drawing, a scenario in which the terminal receives, from the base station, a configuration of a resource which can periodically transmit uplink data without receiving the above PDCCH by the message of the RRC layer is assumed. This scenario can be applied to downlink and uplink respectively, and in this drawing, only the uplink is described for convenience of explanation. The scenario of transmitting the downlink periodically without receiving the PDCCH is called 'downlink has been configured' in the terminal, and the scenario of transmitting the uplink periodically without receiving the PDCCH to be described below is called 'uplink has been configured' in the terminal.

The length of time for the resource to which the uplink data can be transmitted may be an OFDM symbol, a slot, and a subframe unit. In this exemplified drawing, the scenario configured in slot units is assumed, and thus it is assumed that resources 1d-03, 1d-13, 1d-23, 1d-33, 1d-43, 1d-53, 1d-63, 1d-73, and 1d-83 through which the terminal can transmit new uplink data are slots.

On the other hand, when the above periodic uplink data is transmitted, the HARQ process identifier for each new transmission identifies what data is transmitted in the case in which the corresponding data retransmission is required.

The above HARQ process identifier is not an infinite number, and therefore the same HARQ process identifier can be reused for subsequent new data transmission. The HARQ process identifier is determined by the OFDM symbol, the slot, and the subframe identifier at the time when the terminal transmits the uplink data. For example, the HARQ process identifier can be determined as in the following Equation.

HARQ Process ID=[floor (current symbol identifier/cycle of configured uplink allocation)] modulo numberOfConfGrant-Processes (the number of processes of configured uplink of terminal that base station configures)

In this exemplified drawing, the scenario in which the resources 1d-03, 1d-33, and 1d-63 have the same HARQ process identifiers (e.g., identifier #1), and the resources 1d-13, 1d-43, and 1d-73 have the same HARQ process identifier (e.g., identifier #2), and the resources 1d-23, 1d-53, and 1d-83 have the same HARQ process identifiers may be considered (for example, identifier #3).

At this time, whenever each new transmission is performed, the terminal starts a timer called configuredGrantTimer (1d-05), (1d-15), (1d-25) for each process. If the retransmission to this process is made, the configuredGrantTimer is to prevent the retransmission from being retransmitted to the corresponding process until the retransmission is complete. Accordingly, when the data transmission is performed in the slot (1d-03), the configuredGrantTimer is started (1d-05), and when the timer is started, the terminal monitors the PDCCH to determine whether the retransmission to the corresponding HARQ process is made. If the terminal receives the allocation (PDCCH) for retransmission (1d-07) as the HARQ process identifier used in the (1d-03) while the configuredGrantTimer is being started, the terminal restarts (re-drives) the configuredGrantTimer (1d-09).

Thereafter, since the configuredGrantTimer is started by the (1d-09) in the (1d-33) slot using the same HARQ identifier as in the above (1d-03), the terminal does not perform a new transmission in the corresponding (1d-33) slot for the completion of the retransmission in the step (1d-03). If the PDCCH is not received for the retransmission for the corresponding HARQ process identifier until the configuredGrantTimer expires, the terminal can perform a new data transmission upon arrival of a new transmission slot for the corresponding HARQ process identifier (1d-63).

Meanwhile, it can be assumed the scenario that the DRX described in FIG. 1C and the configured uplink transmission described in FIG. 1D are simultaneously set in the terminal. When the DRX is configured as described above, the active time is defined as the following time period during which the terminal needs to monitor the PDCCH transmitted from the base station. In one example, the active time is defined when drx-onDurationTimer or drx-InactiveTimer, drx-RetransmissionTimerDL, drx-RetransmissionTimerUL, or ra-ContentionResolutionTimer is activated. In another example, the active time is defined when the above timer is still pended by transmitting a scheduling request to the base station. In yet another example, the active time is defined when a random access response for a random access preamble that the terminal does not select directly is received and then PDCCH allocated to the C-RNTI of the terminal was not received from the base station.

When the DRX is set in the terminal as described above, the terminal monitors the PDCCH when the drx-RetransmissionTimerDL or the drx-RetransmissionTimerUL timer is started for the HARQ process in order to monitor the scheduling information for the retransmission. The drx-RetransmissionTimerDL or the drx-RetransmissionTimerUL timer starts when drx-HARQ-RTT-TimerDL or drx-HARQ-RTT-TimerUL expires, respectively.

Meanwhile, the drx-HARQ-RTT-TimerDL or a drx-HARQ-RTT-TimerUL timer starts when the terminal allocates a resource for a new transmission on the downlink or the uplink when the terminal monitors the PDCCH in the active time. When the base station allocates the resource to the terminal in the configured uplink or downlink, if the corresponding cycle is aligned with the drx-onDurationTimer, the terminal always transmits a new transmission in accordance with the corresponding drx-onDurationTimer for the configured uplink/downlink (that is, performs the new transmission in the active time), and therefore when the corresponding transmission fails and thus the retransmission is required, the drx-HARQ-RTT-TimerDL or the drx-HARQ-RTT-TimerUL timer starts to drive the drx-RetransmissionTimerDL or the drx-RetransmissionTimerUL timer and the terminal may perform the PDCCH monitoring for the retransmission.

However, the base station may not configure the downlink/uplink and the drx-onDurationTimer configured in this way. For example, when the configured downlink/uplink are short, the DRX cycle itself becomes too short, and the effect of reducing the power consumption may become too small. In other words, the base station can configure the configured uplink having a short cycle to reduce the transmission delay even when the terminal does not always have data to be transmitted. At this time, since the terminal can use the configured uplink of the set short cycle only if there is data to be transmitted, in this case, the base station can be configured in the terminal simultaneously with the DRX. In this case, however, it may be undesirable to set the DRX cycle too short (i.e., to set the drx-onDurationTimer to be too short) because of increasing the power consumption of the terminal.

Accordingly, the disclosure provides that the terminal always starts the drx-HARQ-RTT-TimerDL for the corresponding HARQ process in the corresponding configured resources when the downlink and DRX configured as described above are simultaneously set. At this time, the start timing receives data on the PDSCH from the configured downlink, and starts immediately after transmitting to the PUCCH ACK/NACK information which is a response thereto.

In addition, in the disclosure, when the uplink and DRX configured as described above are simultaneously set, the terminal always starts the drx-HARQ-RTT-TimerUL for the corresponding HARQ process when there is data to be transmitted on the uplink in the corresponding configured resource. At this time, the start timing starts immediately after the data is transmitted on the PUSCH from the configured uplink. If the data is repeatedly transmitted on the uplink, the drx-HARQ-RTT-TimerUL starts immediately after the first transmission among the repeated transmission.

Accordingly, even if the terminal is not in the Active Time, the terminal can start the drx-HARQ-RTT-TimerDL or drx-HARQ-RTT-TimerUL timer, and if the timers expire, the drx-RetransmissionTimerDL or drx-RetransmissionTimerUL timer is started, so the terminal may monitor the PDCCH for the retransmission when the data transmission/reception on the configured downlink/uplink fail.

Figure 1E:
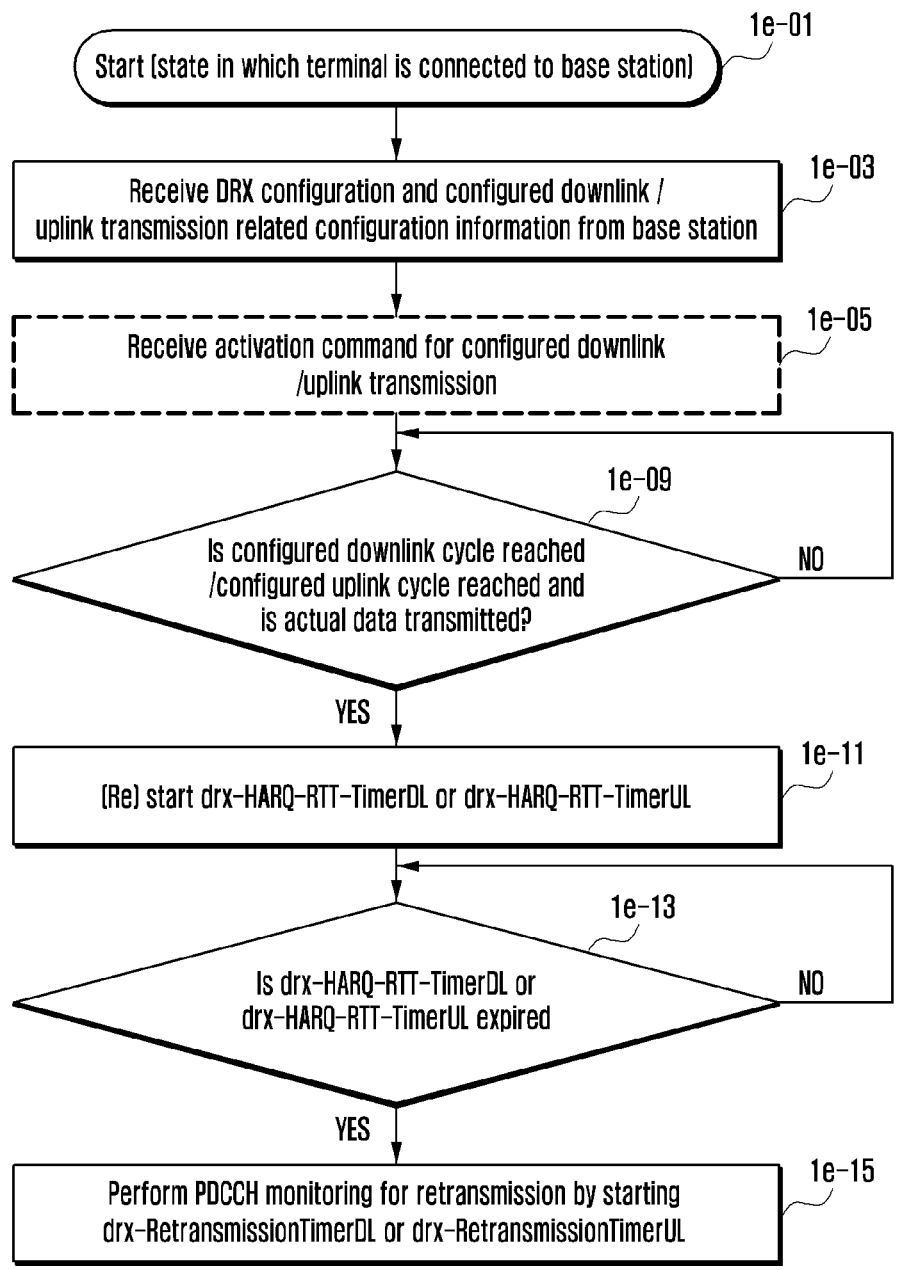
FIG. 1E illustrates an operation sequence of the terminal when DRX and a configured downlink/uplink transmission according to an embodiment of the disclosure are simultaneously set.

FIG. 1E illustrates an operation sequence of the terminal when DRX and a configured downlink/uplink transmission according to an embodiment of the disclosure are simultaneously set.

In the exemplified drawings, the RRC CONNECTED state in which the terminal is connected to the base station is assumed (1e-01). Then, the terminal receives the DRX configuration and the configured downlink and/or uplink transmission related configuration information from the base station through the RRC message (1e-03). For example, the RRC layer message may be an RRCConnectionReconfiguration message.

The DRX is a technique of adjusting the time for monitoring the PDCCH to reduce power consumption of the terminal as described above, and the configured uplink is a technique of periodically transmitting new data without PDCCH. There are two types (Type 1 and Type 2) in the configured uplink. Type 1 is activated simultaneously with RRC reception (i.e., (1e-05) step is unnecessary). In the case of Type 2, a separate activation command and inactivation command are required on the PDCCH after the RRC reception. The DRX configuration and the configuration for the configured uplink can be received through the same RRC message or different RRC messages respectively.

Thereafter, as described above, in the case of the Type 2, the activation command may be received on the PDCCH (1e-05), and the received configuration may be activated to periodically perform the uplink data transmission.

Thereafter, the terminal can perform new data transmission of the configured uplink according to the configured cycle information.

If the configured downlink and DRX are simultaneously configured, the terminal always starts the drx-HARQ-RTT-TimerDL for the corresponding HARQ process (1e-11), when a new transmission cycle of the corresponding configured resource arrives (1e-09). At this time, the start timing receives data on the PDSCH from the configured downlink, and starts immediately after transmitting to the PUCCH ACK/NACK information which is a response thereto.

In addition, if the configured uplink and DRX are simultaneously configured, the terminal always starts the drx-HARQ-RTT-TimerUL for the corresponding HARQ process (1e-11), when a new transmission cycle of the corresponding configured resource arrives, in fact, when there is data to be transmitted to the uplink (1e-09). At this time, the start timing starts immediately after the data is transmitted on the PUSCH from the configured uplink. If the data is repeatedly transmitted on the uplink, the drx-HARQ-RTT-TimerUL starts immediately after the first transmission among the repeated transmission.

Accordingly, even if the terminal is not in the Active Time, the terminal can start the drx-HARQ-RTT-TimerDL or drx-HARQ-RTT-TimerUL timer, and if the drx-HARQ-RTT-TimerDL or drx-HARQ-RTT-TimerUL timers expire (1e-13), the drx-RetransmissionTimerDL or drx-RetransmissionTimerUL timer is driven, so the terminal may monitor the PDCCH for the retransmission when the data transmission/reception on the configured downlink/uplink fails (1e-15).

Figure 1F:
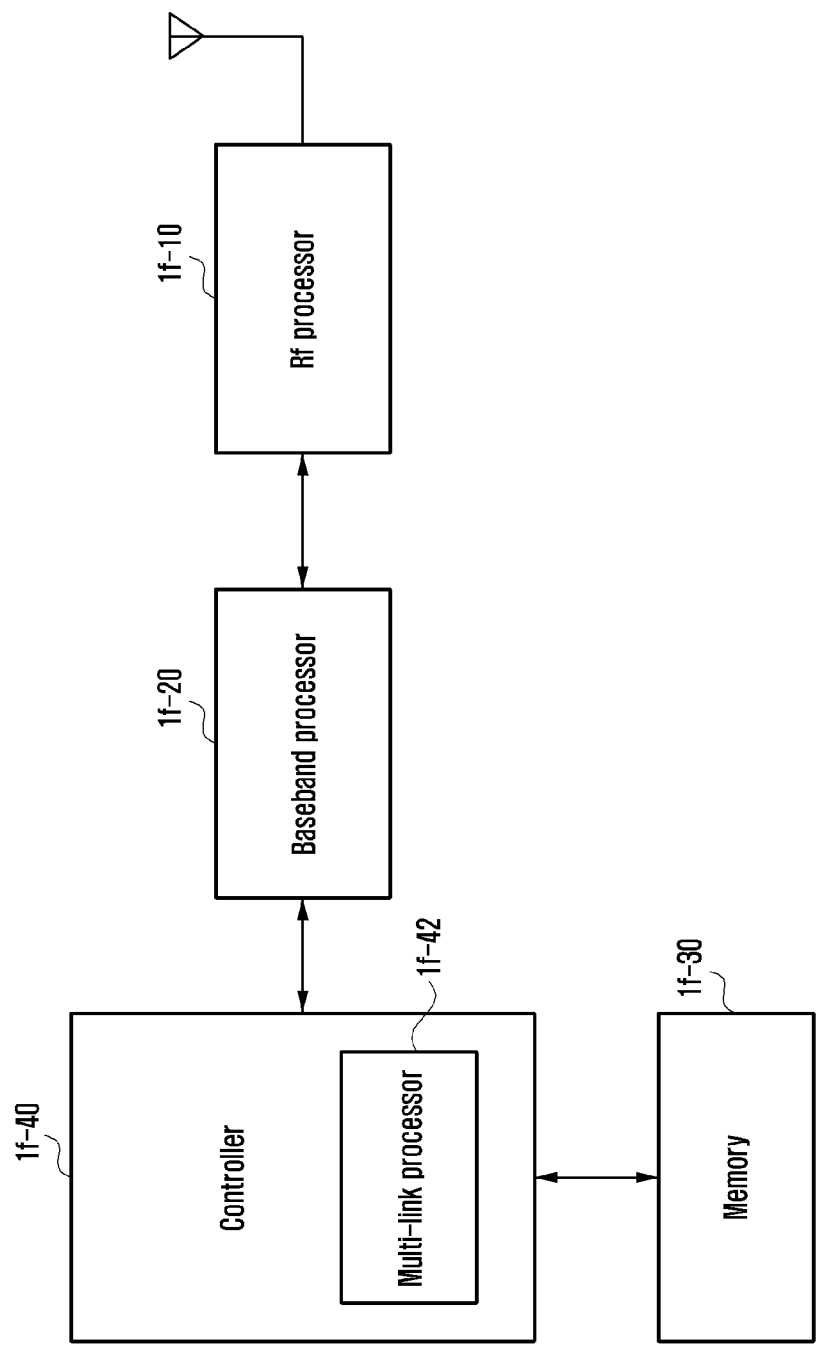
FIG. 1F illustrates a configuration of the terminal according to an embodiment of the disclosure.

FIG. 1F illustrates a configuration of the terminal according to an embodiment of the disclosure.

Referring to FIG. 1F, the terminal includes a radio frequency (RF) processor 1f-10, a baseband processor 1f-20, a memory 1f-30, and a controller 1f-40.

The RF processor 1f-10 serves to transmit and receive a signal through a radio channel, such as band conversion and amplification of a signal. That is, the RF processor 1f-10 may up-convert a baseband signal provided from the baseband processor 1f-20 into an RF band signal and then transmit the RF band signal through an antenna and down-convert the RF band signal received through the antenna into the baseband signal. For example, the RF processor 1f-10 may include a transmitting filter, a receiving filter, an amplifier, a mixer, an oscillator, a digital to analog converter (DAC), an analog to digital converter (ADC), or the like. FIG. 1F illustrates only one antenna but the terminal may include a plurality of antennas.

Further, the RF processor 1f-10 may include a plurality of RF chains. Further, the RF processor 1f-10 may perform beamforming. For the beamforming, the RF processor 1f-10 may adjust a phase and a size of each of the signals transmitted and received through a plurality of antennas or antenna elements.

The baseband processor 1f-20 performs a conversion function between a baseband signal and a bit string according to a physical layer standard of a system. For example, when data are transmitted, the baseband processor 1f-20 generates complex symbols by coding and modulating a transmitted bit string. Further, when data are received, the baseband processor 1f-20 recovers the received bit string by demodulating and decoding the baseband signal provided from the RF processor 1f-10. For example, according to the orthogonal frequency division multiplexing (OFDM) scheme, when data are transmitted, the baseband processor 1f-20 generates the complex symbols by coding and modulating the transmitted bit string, maps the complex symbols to sub-carriers, and then performs an inverse fast Fourier transform (IFFT) operation and a cyclic prefix (CP) insertion to construct the OFDM symbols.

Further, when data are received, the baseband processor 1f-20 divides the baseband signal provided from the RF processor 1f-10 in an OFDM symbol unit and recovers the signals mapped to the sub-carriers by a fast Fourier transform (FFT) operation and then recovers the received bit string by the demodulation and decoding.

The baseband processor 1f-20 and the RF processor 1f-10 transmit and receive a signal as described above. Therefore, the baseband processor 1f-20 and the RF processor 1f-10 may be called a transmitter, a receiver, a transceiver, or a communication interface. Further, at least one of the baseband processor 1f-20 and the RF processor 1f-10 may include different communication modules to process signals in different frequency bands. Further, the different frequency bands may include a super high frequency (SHF) (for example: 2.5 GHz, 5 GHz) band, a millimeter wave (for example: 60 GHz) band.

The memory f-30 stores data such as basic programs, application programs, and configuration information for the operation of the terminal.

The controller f-40 controls the overall operations of the terminal. For example, the controller f-40 transmits and receives a signal through the baseband processor 1f-20 and the RF processor 1f-10. Further, the controller 1f-40 records and reads data in and from the memory 1f-30. For this purpose, the controller f-40 may include at least one processor. For example, the controller f-40 may include a communication processor (CP) performing a control for communication and an application processor (AP) controlling an upper layer such as the application programs.

According to the embodiment of the disclosure, the controller 1f-40 includes a multi-link processor f-42 that performs the processing to be operated in a multi-link mode. For example, the controller f-40 may control the terminal to perform the procedure illustrated in the operation of the terminal illustrated in FIG. 1F.

According to the embodiment of the disclosure, the terminal drives HARQ RTT Timers according to the above-described conditions according to the DRX configuration information and the configured downlink/uplink transmission information configured from the base station, and when retransmission is required, the terminal may monitor the PDCCH at the corresponding timing to receive the retransmission-related scheduling information.

Second Embodiment

Figure 2A:
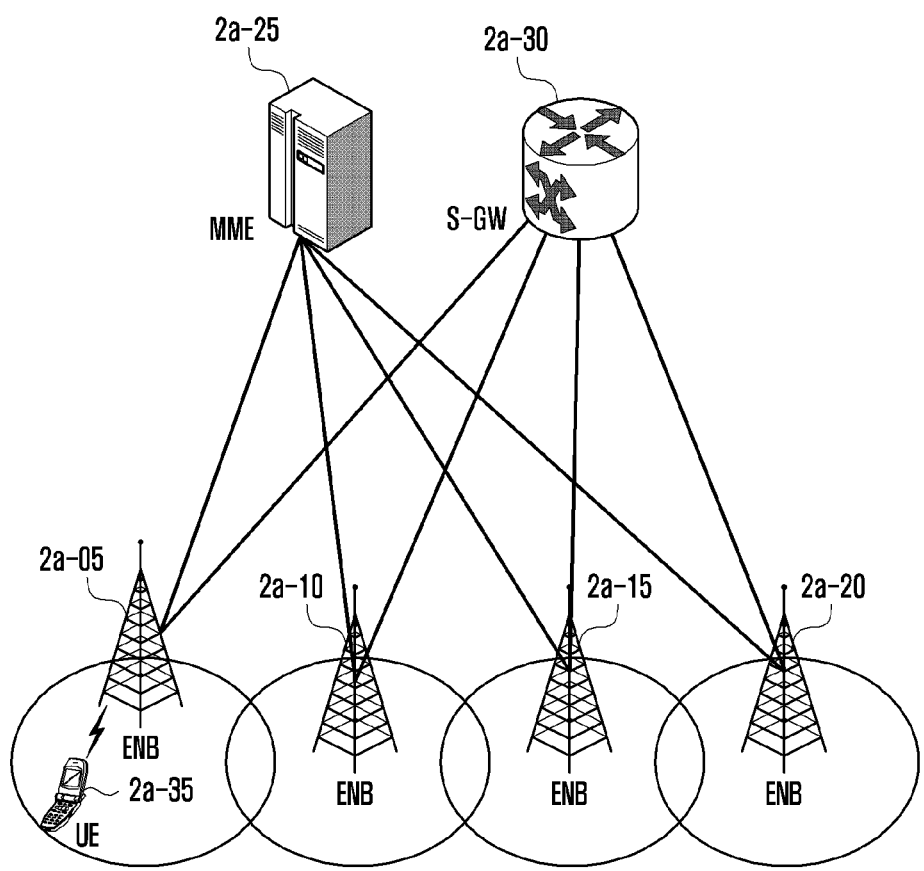
FIG. 2A illustrates a structure of an LTE system according to another embodiment of the disclosure.

FIG. 2A illustrates a structure of an LTE system according to another embodiment of the disclosure.

As illustrated in FIG. 2A, a radio access network of an LTE system is configured to include next generation base stations (evolved node B, hereinafter, eNB, Node B, or base station) 2a-05, 2a-10, 2a-15, and 2a-20, a mobility management entity (MME) 2a-25, and a serving-gateway (S-GW) 2a-30. User equipment (hereinafter, UE or terminal) 2a-35 accesses an external network through the eNBs 2a-05, 2a-10, 2a-15, and 2a-20 and the S-GW 2a-30.

In FIG. 2A, the eNBs 2a-05 to 2a-20 correspond to the existing node B of the UMTS system. The eNB 2a-05 is connected to the UE 2a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the terminals is required. Here, the eNBs 2a-05, 2a-10, 2a-15, and 2a-20 take charge of the collecting and scheduling. One eNB generally controls a plurality of cells.

For example, to implement a transmission rate of 100 Mbps, the LTE system uses, as a radio access technology, orthogonal frequency division multiplexing (hereinafter, OFDM) scheme in, for example, a bandwidth of 20 MHz. Further, an adaptive modulation and coding (hereinafter, referred to as AMC) scheme determining a modulation scheme and a channel coding rate according to a channel status of the terminal is applied. The S-GW 2a-30 is an apparatus for providing a data bearer and generates or removes the data bearer according to the control of the MME 2a-25. The MME 2a-25 is a device for performing various control functions as well as a mobility management function for the terminals 2a-35 and is connected to a plurality of base stations 2a-05, 2a-10, 2a-15 and 2a-20.

Figure 2B:
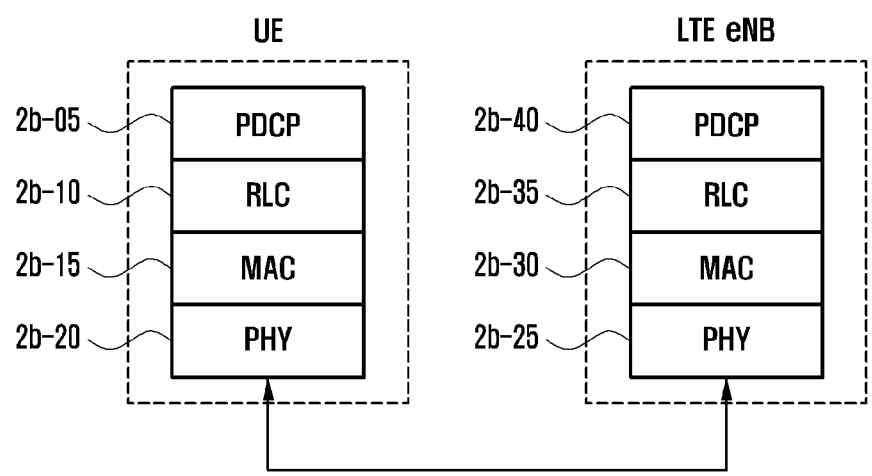
FIG. 2B illustrates a radio protocol structure in the LTE system according to another embodiment of the disclosure.

FIG. 2B illustrates a radio protocol structure in the LTE system according to another embodiment of the disclosure.

Referring to FIG. 2B, the radio protocol of the LTE system is configured to include packet data convergence protocols (PDCPs) 2b-05 and 2b-40, radio link controls (RLCs) 2b-10 and 2b-35, and medium access controls (MACs) 2b-15 and 2b-30, respectively, in the terminal and the eNB. The PDCPs 2b-05 and 2b-40 are in charge of operations such as IP header compression/decompression. The main functions of the PDCP are summarized as follows: header compression and decompression function (header compression and decompression: ROHC only); transfer function of user data (transfer of user data); in-sequence delivery function (in-sequence delivery of upper layer PDUs at PDCP re-establishment procedure for RLC AM); reordering function (For split bearers in DC (only support for RLC AM): PDCP PDU routing for transmission and PDCP PDU reordering for reception); duplicate detection function (duplicate detection of lower layer SDUs at PDCP re-establishment procedure for RLC AM); retransmission function (retransmission of PDCP SDUs at handover and, for split bearers in DC, of PDCP PDUs at PDCP data-recovery procedure, for RLC AM); ciphering and deciphering function (ciphering and deciphering); and/or timer-based SDU discard function (timer-based SDU discard in uplink).

The radio link controls (hereinafter, referred to as RLCs) 2b-10 and 2b-35 reconfigures the PDCP packet data unit (PDU) to an appropriate size to perform the ARQ operation or the like. The main functions of the RLC are summarized as follows: data transfer function (transfer of upper layer PDUs); ARQ function (error correction through ARQ (only for AM data transfer)); concatenation, segmentation, reassembly functions (concatenation, segmentation and reassembly of RLC SDUs (only for UM and AM data transfer)); re-segmentation function (re-segmentation of RLC data PDUs (only for AM data transfer)); reordering function (reordering of RLC data PDUs (only for UM and AM data transfer); duplicate detection function (duplicate detection (only for UM and AM data transfer)); error detection function (protocol error detection (only for AM data transfer)); RLC SDU discard function (RLC SDU discard (only for UM and AM data transfer)); and/or RLC re-establishment function (RLC re-establishment).

The MACs 2b-15 and 2b-30 are connected to several RLC layer entities configured in one terminal and perform an operation of multiplexing RLC PDUs into an MAC PDU and demultiplexing the RLC PDUs from the MAC PDU. The main functions of the MAC are summarized as follows.
  mapping function (mapping between logical channels and transport channels);
  multiplexing/demultiplexing function (multiplexing/demultiplexing of MAC SDUs belonging to one or different logical channels into/from transport blocks (TB) delivered to/from the physical layer on transport channels); scheduling information reporting function (scheduling information reporting); HARQ function (Error correction through HARQ); priority handling function between logical channels (priority handling between logical channels of one UE); priority handling function between terminals (priority handling between UEs by means of dynamic scheduling); MBMS service identification function (MBMS service identification); transport format selection function (transport format selection); and/or padding function (padding).

Physical layers 2b-20 and 2b-25 perform an operation of channel-coding and modulating upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 2C:
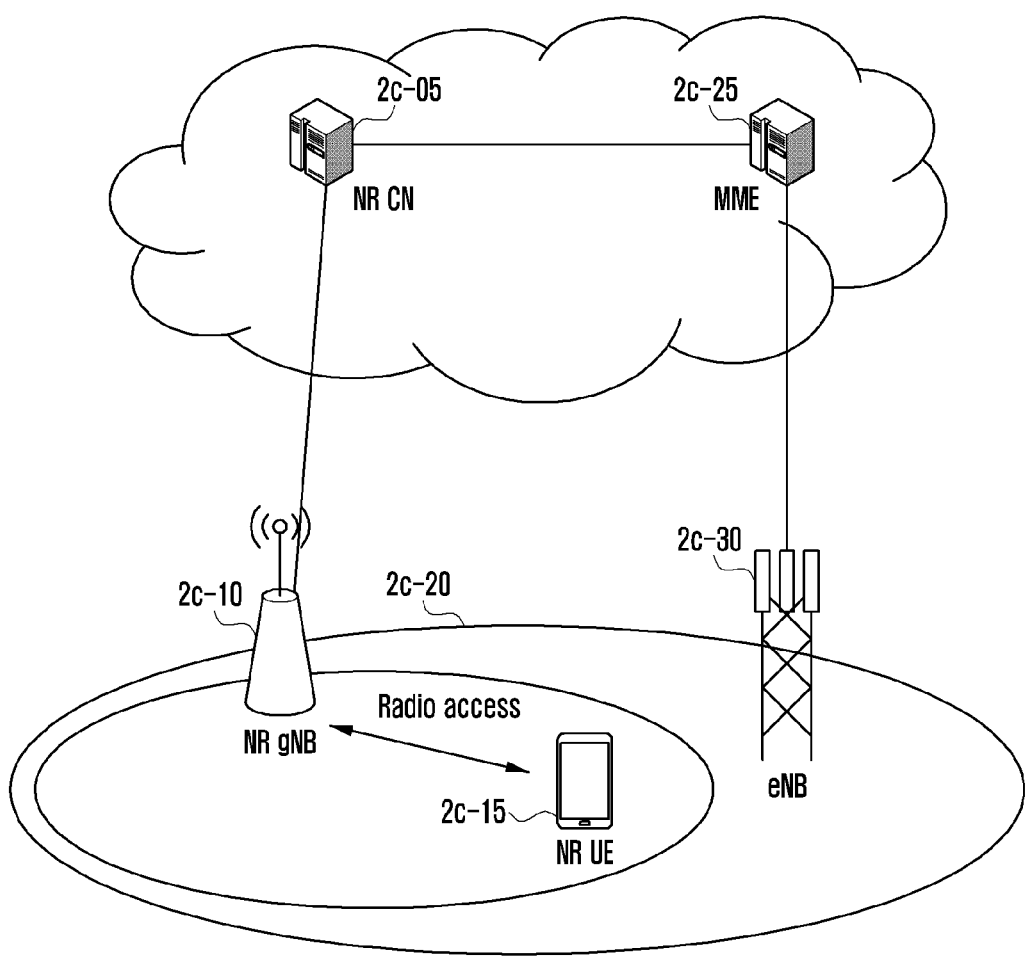
FIG. 2C illustrates a structure of a next generation mobile communication system according to another embodiment of the disclosure.

FIG. 2C illustrates a structure of a next generation mobile communication system according to another embodiment of the disclosure.

Referring to FIG. 2C, a radio access network of a next generation mobile communication system (hereinafter referred to as NR or 5G) is configured to include a next generation base station (new radio node B, hereinafter NR NB or NR gNB) 2c-10 and a new radio core network (NR CN) 2c-05. The user terminal (new radio user equipment, hereinafter, NR UE or terminal) 2c-15 accesses the external network through the NR gNB 2c-10 and the NR CN 2c-05.

In FIG. 2C, the NR gNB 2c-10 corresponds to an evolved node B (eNB) of the existing LTE system. The NR gNB 2c-10 is connected to the NR UE 2c-15 via a radio channel and may provide a service superior to the existing node B.

In the next generation mobile communication system, since all user traffics are served through a shared channel, an apparatus for collecting status information such as a buffer status, an available transmission power status, and a channel status of the UEs to perform scheduling is required. The NR gNB 2c-10 may serve as the device. One NR gNB generally controls a plurality of cells. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) scheme as a radio access technology.

Further, an adaptive modulation and coding (hereinafter, referred to as AMC) scheme determining a modulation scheme and a channel coding rate according to a channel status of the terminal is applied. The NR CN 2c-05 may perform functions such as mobility support, bearer setup, QoS setup, and the like. The NR CN 2c-05 is a device for performing a mobility management function for the terminal and various control functions and is connected to a plurality of base stations. In addition, the next generation mobile communication system can interwork with the existing LTE system, and the NR CN 2c-05 is connected to the MME 2c-25 through the network interface. The MME 2c-25 is connected to the eNB 2c-30 which is the existing base station.

Figure 2D:
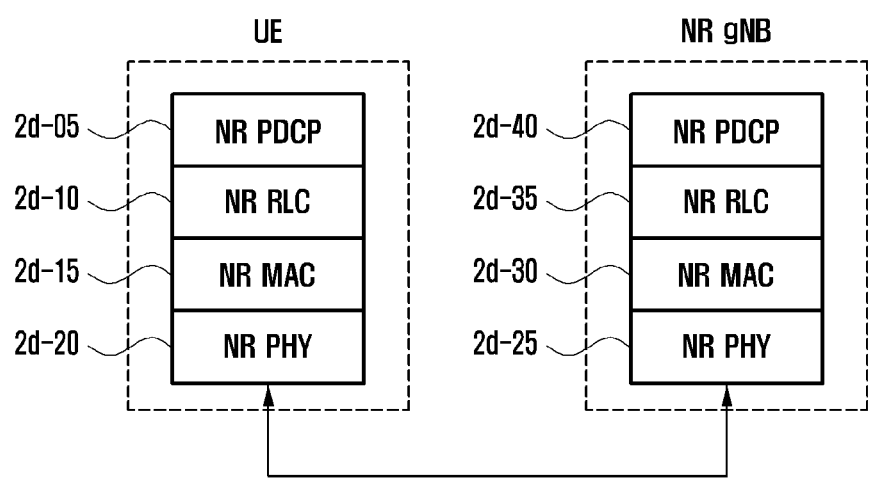
FIG. 2D illustrates a radio protocol structure of a next generation mobile communication system according to an embodiment of the disclosure.

FIG. 2D illustrates a radio protocol structure of a next generation mobile communication system according to an embodiment of the disclosure.

Referring to FIG. 2D, the radio protocol of the next generation mobile communication system is configured to include NR PDCPs 2d-05 and 2d-40, NR RLCs 2d-10 and 2d-35, and NR MACs 2d-15 and 2d-30, respectively, in the terminal and the NR base station. The main functions of the NR PDCPs 2d-05 and 2d-40 may include some of the following functions: header compression and decompression function (header compression and decompression: ROHC only); transfer function of user data (transfer of user data); in-sequence delivery function (in-sequence delivery of upper layer PDUs); reordering function (PDCP PDU reordering for reception); duplicate detection function (duplicate detection of lower layer SDUs); retransmission function (retransmission of PDCP SDUs); ciphering and deciphering function (ciphering and deciphering); and/or timer-based SDU discard function (timer-based SDU discard in uplink).

In this case, the reordering function of the NR PDCP apparatus refers to a function of reordering PDCP PDUs received in a lower layer in order based on a PDCP sequence number (SN) and may include a function of transferring data to the upper layer in the reordered order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 2d-10 and 2d-35 may include some of the following functions: data transfer function (transfer of upper layer PDUs); in-sequence delivery function (in-sequence delivery of upper layer PDUs); out-of-sequence delivery function (out-of-sequence delivery of upper layer PDUs); ARQ function (error correction through ARQ); concatenation, segmentation, reassembly function (concatenation, segmentation and reassembly of RLC SDUs); re-segmentation function (re-segmentation of RLC data PDUs); reordering function (reordering of RLC data PDUs); duplicate detection function (duplicate detection); error detection function (protocol error detection); RLC SDU discard function (RLC SDU discard); and/or RLC re-establishment function (RLC re-establishment).

In the above description, the in-sequence delivery function of the NR RLC apparatus refers to a function of delivering RLC SDUs received from a lower layer to an upper layer in order, and may include a function of reassembling and delivering an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, and a function of requesting a retransmission of the lost RLC PDUs.

In the above description, the in-sequence delivery function of the NR RLC apparatus may include a function of in sequence delivering, to the upper layer, only the RLC SDUs before the lost RLC SDU when there is the lost RLC SDU, a function of in sequence delivering, to the upper layer, all the RLC SDUs received before the timer starts when the predetermined timer expires even though there is the lost RLC SDU, or a function of in sequence delivering, to the upper layer, all the RLC SDUs received until now if the predetermined timer expires even if there is the lost RLC SDU.

Further, the NR RLC may process the RLC PDUs in the received order (in order of arrival regardless of the order of a sequence number and the sequence number), and may deliver the processed RLC PDUs to the PDCP entity the out-of-sequence delivery. In the case of the segment, the NR RLC may receive the segments which are stored in the buffer or is to be received later and reconfigure the RLC PDUs into one complete RLC PDU and then deliver the complete RLC PDU to the PDCP entity. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order. Originally, when one RLC SDU is split into several RLC SDUs and received, the out-of-sequence delivery function of the NR RLC apparatus may include a function of reassembling and delivering the RLC SDUs and may include a function of storing the RLC SNs or the PDCP SNs of the received RLC PDUs and ordering the RLC SNs or the PDCP SNs to record the lost RLC PDUs.

The NR MACs 2d-15 and 2d-30 may be connected to several NR RLC layer apparatus configured in one terminal, and the main functions of the NR MAC may include some of the following functions: mapping function (mapping between logical channels and transport channels); multiplexing and demultiplexing function (multiplexing/demultiplexing of MAC SDUs); scheduling information reporting function (scheduling information reporting); HARQ function (error correction through HARQ); priority handling function between logical channels (priority handling between logical channels of one UE); priority handling function between terminals (priority handling between UEs by means of dynamic scheduling); MBMS service identification function (MBMS service identification); transport format selection function (transport format selection); and/or padding function (padding).

The NR PHY layers 2d-20 and 2d-25 may perform an operation of channel-coding and modulating upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 2E:
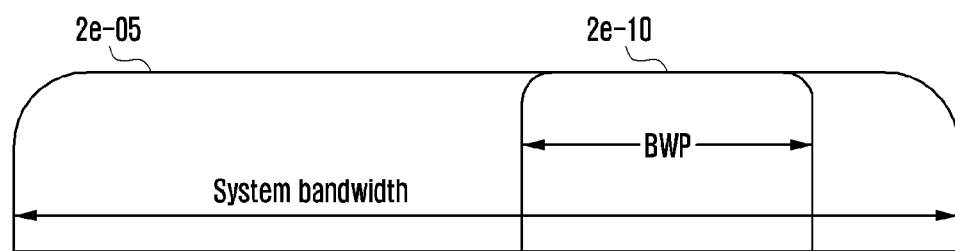
FIG. 2E illustrates a scenario in which a bandwidth part is applied in the next generation mobile communication system according to an embodiment of the disclosure.
Figure 2E:
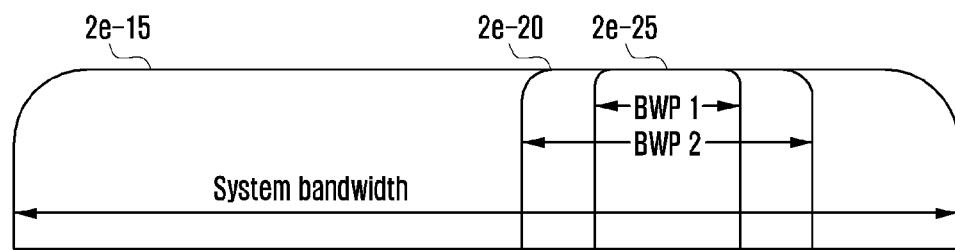
Figure 2E:
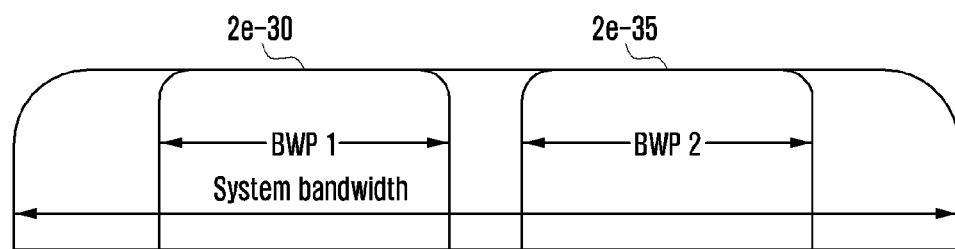

FIG. 2E illustrates a scenario in which a bandwidth part is applied in the next generation mobile communication system according to an embodiment of the disclosure.

A bandwidth part (BWP) application technology means that a terminal performs communication using only some bandwidths of system bandwidths used by one cell. Essentially, the NR may support a wide range of frequency bands (e.g., 400 MHz bandwidth) compared to the LTE, so it can be a burden on implementation for the terminal which meet all of the system's frequency bandwidths, and for some terminals, there may be no problem in supporting only a small range of frequency bandwidth. The BWP is used to reduce the manufacturing cost of the terminal or to save power of the terminal. The BWP may be configured by the base station only for the terminal supporting the purpose.

Referring to FIG. 2E, there are largely three BWP operating scenarios in the NR.

A first scenario is to apply the BWP for the terminal that supports only a frequency bandwidth 2e-10 narrower than a system bandwidth 2e-05 used by one cell. To reduce the manufacturing cost, a specific terminal may be developed to support a limited bandwidth. The terminal needs to report to the base station supporting only the limited bandwidth, and accordingly, the base station configures the maximum bandwidth or less BWP supported by the terminal.

A second scenario is to apply the BWP for terminal power saving. For example, one terminal performs communication using the entire system bandwidth 2e-15 or a partial bandwidth 2e-20 used by one cell, but the communication base station may set a narrower bandwidth 2e-25 for the saving purpose.

A third scenario is to apply individual BWPs corresponding to different numerologies. The numerology means that a physical layer configuration is diversified in order to implement optimal data transmission according to various service requirements. For example, in an OFDMA structure having a plurality of subcarriers, a separation distance between the subcarriers may be variably adjusted according to a predetermined requirement. One terminal may communicate by applying a plurality of numerologies at the same time. At this time, since the physical layer configuration corresponding to each numerology is described above, it is preferable to divide and apply each numerology into separate BWPs 2e-35 and 2e-40.

Since a supportable bandwidth is different for each terminal in the NR, in initial access, communication may be performed with primary BWP applicable to all terminals and the BWP for a specific terminal is applied from a predetermined point in time. The applied BWP may be changed through predetermined signaling and the BWP to be applied in the target cell at the time of handover is indicated to the UE through the predetermined signaling. In addition, the BWP timer may exist to specify the use of a particular BWP for the above terminal and may be delivered by the RRC signaling.

This timer means the operation of stopping the use of the configured BWP if there is no use of the activated BWP and returning to the initial applied primary BWP. The BWP switching operation through the above BWP timer can be configured by the base station for the purpose of fallback operation of appropriate BWP and reduction of terminal power.

Figure 2F:
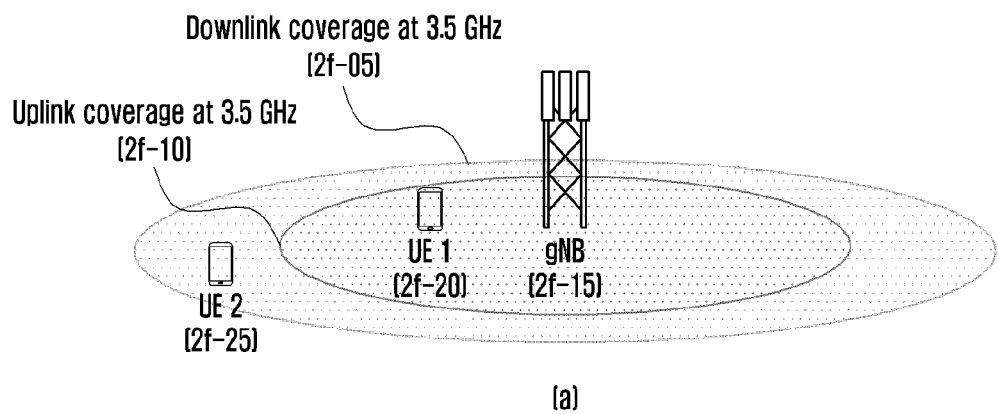
FIG. 2F illustrates a diagram for applying an additional uplink frequency according to an embodiment of the disclosure.
Figure 2F:
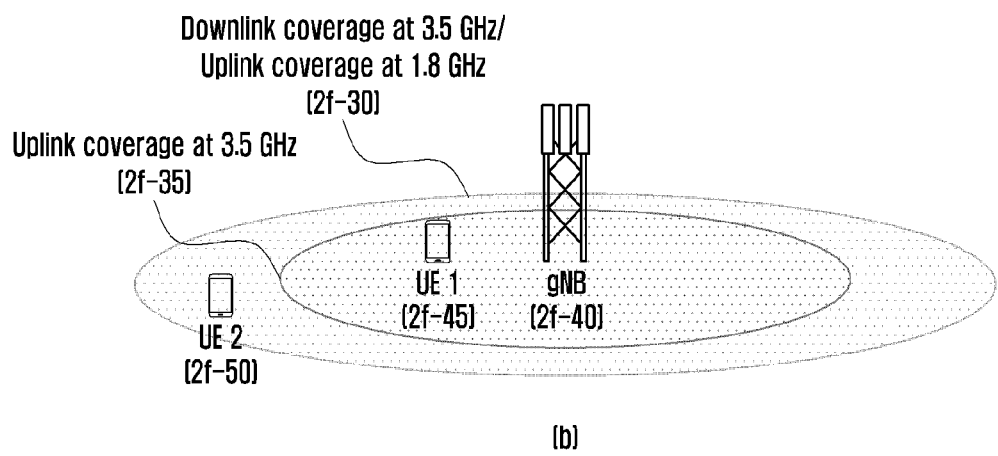

FIG. 2F illustrates a diagram for applying an additional uplink frequency according to an embodiment of the disclosure.

In the mobile communication system, a mismatch of a service area may occur on the uplink and the downlink. The mismatch may occur due to differences in the channel characteristics of the uplink and the downlink, or due to a limitation of the maximum transmission power of the terminal or a structural limitation of the transmission antenna. Typically, the service area of the downlink is wider than the service area of the uplink. For example, in the 3.5 GHz TDD system, the service area 2f-05 of the downlink is wider than the service area 2f-10 of the uplink. In this case, the first terminal 2f-20 has no problem in receiving the service on the uplink and the downlink, but the second terminal 2f-25 has a problem in successfully transmitting the data to the base station 2f-15 on the uplink.

Therefore, in order to eliminate the problem due to the mismatch, the effective service area of the downlink is reduced to match between the service area of the downlink and the service area of the uplink. That is, although a wider service area may be provided on the downlink, the service area of the uplink is limited.

In the next generation mobile communication system, in order to solve the performance limitation due to such mismatch, the terminal may apply the uplink frequency having a wider service area. For example, an uplink of 3.5 GHz and a separate uplink 2f-30 of 1.8 GHz are additionally provided to the terminal. The additional uplink frequency is referred to as a supplementary uplink (SUL) frequency.

Due to the frequency characteristics, the lower the frequency band, the longer the radio signal propagation distances. Thus, 1.8 GHz, which is lower than 3.5 GHz enables a wider service area. Accordingly, the second terminal 2f-50 may successfully transmit data to the base station 2f-40 using the uplink 2f-35 of 1.8 GHz. In addition, the first terminal 2f-45 is not related to the service area problem. However, since both the 1.8 GHz and 3.5 GHz uplinks can be used, one of the 1.8 GHz and 3.5 GHz uplinks may be selected and used for the purpose of dispersing the access congestion of the uplink. The additional uplink frequency may be an LTE frequency.

Both the NR uplink frequency and the SUL frequency can be set for one terminal. At this time, the uplink data channel PUSCH can be transmitted on only one uplink at a time. The PUCCH is also transmitted on only one uplink at a time, and may be transmitted in the same or different uplink as or to the PUSCH.

The base station supporting the SUL provides a first threshold value required for determining the uplink on which random access is attempted to terminals in the cell using system information. The terminal supporting the SUL measures a sync signal block (SSB) broadcasted by the base station on the downlink to derive RSRP and compares the derived RSRP with the first threshold value. If the measured downlink channel quality is lower than the first threshold value, the terminal selects the SUL frequency on an uplink on which random access is attempted. Otherwise, the terminal performs random access at the NR uplink frequency.

In the embodiment of the disclosure, the operation related to various BWPs introduced in the NR, in particular, the BWP switching operation will be described. The BWP can be largely classified into three types. First, there is a first BWP that can be defined as a first BWP or an initial BWP. The first BWP includes the system information, in particular, the configuration information of the first BWP applied for initial access to the MSI. The configuration information of the BWP includes a center frequency, frequency bandwidth information, and random access radio resource information. At this time, the center frequency and the bandwidth information may be separately indicated on the uplink and the downlink. The random access radio resource may be within at least the frequency bandwidth. The frequency bandwidth information can be indicated in PRB number or units of Hz. As another example, the downlink configuration information of the first BWP may follow that of the MSI. In this case, the MSI does not need to separately include the configuration information of the first BWP, or includes only the uplink frequency information and the random access radio resource information.

The initial connection operation and communication are performed through the first BWP, and the terminal also receives a predetermined RRC control message from the base station using the first BWP. In the RRC message, a list of a plurality (up to four BWPs per serving cell) of BWPs supported by the corresponding serving cell and valid BWP timer information for the corresponding serving cell are provided, and the BWP configuration included in the corresponding list includes a BWP index and specific BWP configuration information. That is, the base station can be instructed by the uplink and downlink for each BWP information including the center frequency and frequency bandwidth information for the BWPs supported by the corresponding serving cell in the RRC message. The frequency bandwidth does not exceed the maximum frequency bandwidth included in the capability information of the terminal.

In addition, among the BWPs included in the BWP list, the base station may include an indicator indicating the second BWP and the third BWP. The second BWP is defined as a primary BWP or a default BWP, and is a fallback BWP in which the terminal operates as another BWP in the corresponding serving cell and is operated by returning if the BWP timer expires. Also, the third BWP means a BWP in which the base station is initially activated through the RRC configuration among the plurality of BWPs. The second BWP and the third BWP may be set to the same BWP and may be set to different BWPs.

control message or may include a control message triggering the activation of the corresponding BWP in the downlink control information (DCI) of the physical downlink control channel (PDCCH).

Also, in the disclosure, it is divided depending on whether the uplink BWP and the downlink BWP exist in the same frequency band, that is, whether the uplink and downlink BWPs are time division multiplexing (TDM) or frequency division multiplexing (FDM). If the uplink BWP and the downlink BWP are FDMed, that is, if the uplink BWP and the downlink BWP are activated in different frequency bands, the uplink/downlink operates in a paired spectrum, and if the uplink BWP and the downlink BWP are TDMed, that is, if the uplink BWP and the downlink BWP are activated with time difference in the same frequency band, the uplink/downlink operates in the unpaired spectrum. The following description of the disclosure will be made on the basis of the above definition and operation.

Figure 2G:
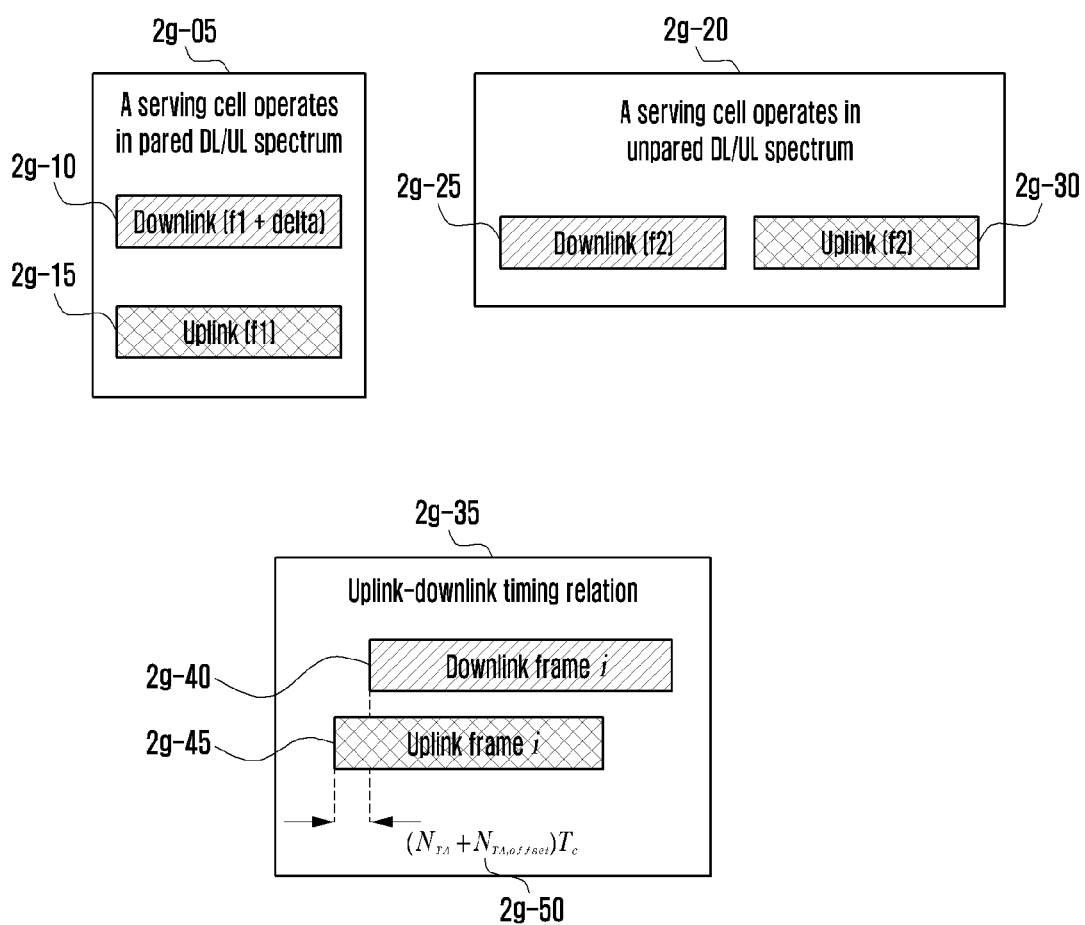
FIG. 2G illustrates a bandwidth part switching operation in a general serving cell according to an embodiment of the disclosure.

FIG. 2G illustrates a diagram for describing a bandwidth part switching operation in a general serving cell according to an embodiment of the disclosure.

2g-05 is a diagram for the case in which the uplink/downlink operates in the paired spectrum, and a downlink frequency f1+delta of 2g-10 and an uplink frequency f1 of 2g-15 shows a difference in a frequency domain by delta and is configured and activated. On the other hand, 2g-20 is a diagram for the case in which the uplink/downlink operates in the unpaired spectrum, and a downlink frequency f2 of 2g-25 and an uplink frequency f2 of 2g-30 is configured and activated in the same frequency domain and the BWP area is divided in the time area.

In the above two cases, the operation when the terminal is instructed to perform uplink/downlink scheduling, i.e., BWP switching, can be summarized as shown in the following table.

TABLE 2

| | UL/DL BWP switching operation when one uplink exists | |
|---|---|---|
| | Paired spectrum | Unpaired spectrum |
| Downlink scheduling | Instruct switching to the corresponding BWP, including specific BWP index in DCI 1 for downlink scheduling => Switch to BWP indicated only by downlink BWP and maintain uplink BWP into current configuration | Instruct switching to the corresponding BWP, including specific BWP index in DCI 1 for downlink scheduling => Switch both of downlink BWP and linked uplink BWP to indicated BWP |
| Uplink scheduling | Instruct switching to the corresponding BWP, including specific BWP index in DCI 0 for uplink scheduling => Switch to BWP indicated only by uplink BWP and maintain downlink BWP into current configuration | Instruct switching to the corresponding BWP, including specific BWP index in DCI 0 for uplink scheduling => Switch both of uplink BWP and linked downlink BWP to indicated BWP |

If the terminal supports a plurality of Numerologies, and the base station desires to set a BWP according to Numerology, the RRC control message includes configuration information for a plurality of BWPs. The BWP can move the center frequency at predetermined time intervals according to a predetermined pattern while maintaining the same bandwidth. This is called frequency hopping, and the pattern information and information indicating whether to perform the pattern information may be included in the configuration information. An indicator for activating the configured downlink and uplink BWPs may be included in the RRC In addition, if the terminal is operating at the third BWP and then the BWP timer (BWP-inactivityTimer) expires, the operation to make the fallback to the second BWP can be summarized by being classified into the case in which the uplink/downlink is operating in the paired spectrum and the case in which the uplink/downlink is operating in the unpaired spectrum.

For the above two cases, the BWP switching operation of the terminal when the BWP timer of the terminal expires can be summarized as shown in the table below.

TABLE 3

Operation when BWP timer expires in case in which one uplink exists

| | Paired spectrum | Unpaired spectrum |
|---|---|---|
| Bwp-inactivityTimer start (BWP timer start) | When DCI 1 for downlink scheduling is received and the corresponding DCI indicates second BWP other than third BWP, Bwp-inactivityTimer starts | When DCI 1 for downlink scheduling or DCI 0 for uplink scheduling is received and the corresponding DCI indicates second BWP other than third BWP, Bwp-inactivityTimer starts |
| Upon expiry of Bwp-inactivityTimer (BWP timer expires) | Downlink: Switch to second BWP of downlink already configured Uplink: Maintain operation in uplink BWP currently activated | Downlink: Switch to second BWP of downlink already configured Uplink: Switch to second BWP of uplink already configured |

2g-35 is a drawing for describing the timing relationship between the uplink-downlink of the terminal, 2g-40 indicates an i-th downlink frame of the terminal, and 2g-45 indicates an i-th uplink frame of the terminal.

In this case 2g-50, the timing advance between the downlink and the uplink is defined as $T_{TA}=(N_{TA}+N_{TA,offset})T_c$. Here, $N_{TA}$ means an offset between the radio frames of the uplink and the downlink, and $N_{TA\ offset}$ is a fixed value corresponding to the time for the terminal to switch from the uplink to the downlink. The $N_{TA\ offset}$ value is 0 for frequency division duplex (FDD), and has different values according to the frequency band only for time division duplex (TDD), and is defined as $N_{TA\ offset}=624.64/2^\mu$. Here, μ represents the value of the supporting transfer numerology and has the following table values.

TABLE 4

| NR numerology | | |
|---|---|---|
| μ | $\Delta f = 2^\mu \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |

In addition, the above $T_c=1/(\Delta f_{max} \cdot Nf)$ is a minimum value in the time domain in NR, and is a time value for confirming an OFDM symbol within a range without oversampling.

In summary, if all the serving cells of the same time advance group (TAG) operate in the uplink/downlink paired spectrum, the $N_{TA\ offset}$ of the corresponding serving cell has a value of zero. On the other hand, if there is at least one serving cell operating in the uplink/downlink unpaired spectrum in the same time advance group (TAG), the serving cell has a value of $N_{TA\ offset}=624.64/2^\mu$ of the corresponding serving cell. In the above, the TAG means a group having the same time synchronization value, and the uplink time synchronization of the serving cells belonging to the group is considered to be the same.

Figure 2H:
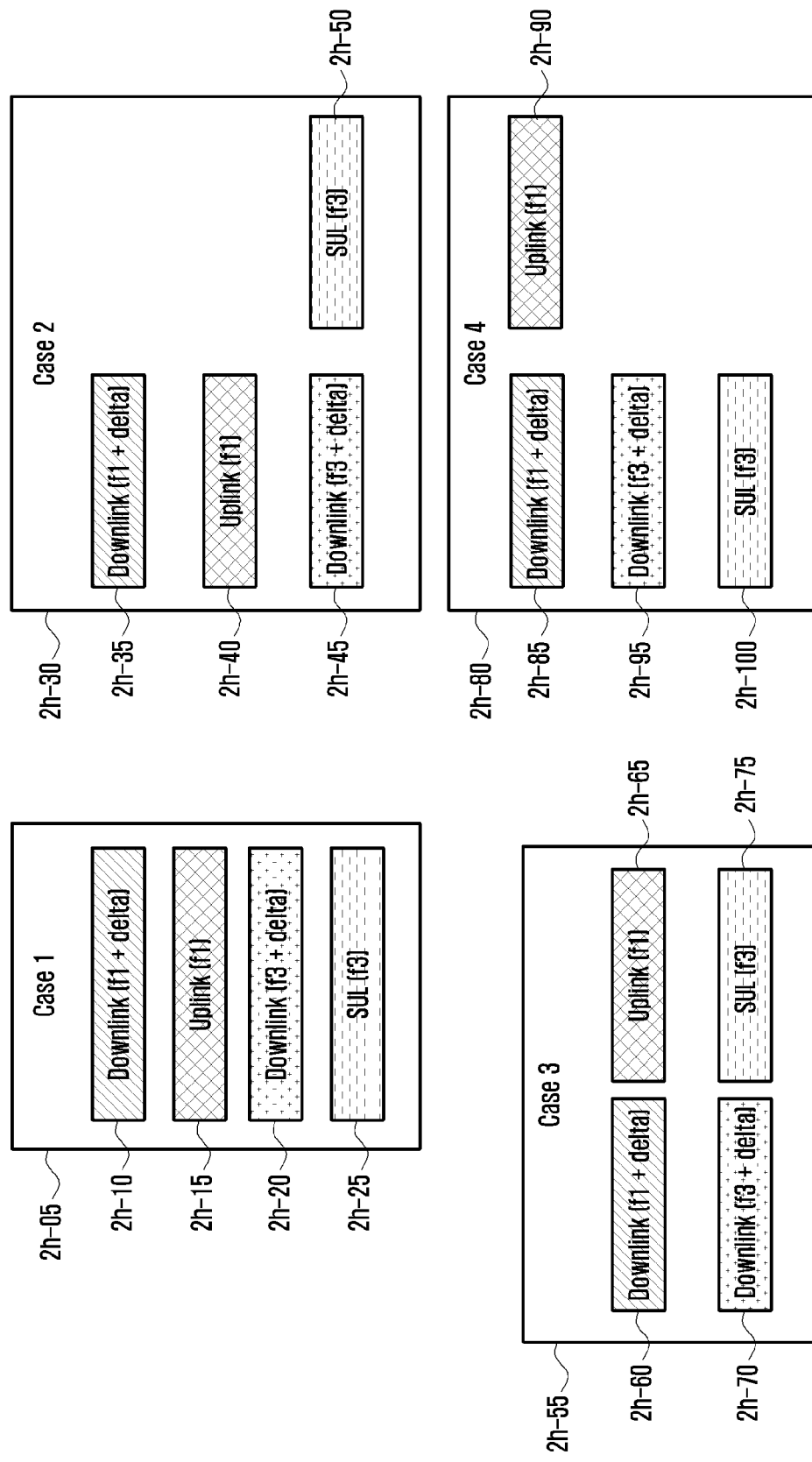
FIG. 2H illustrates a bandwidth part switching operation in a serving cell in which an additional uplink according to an embodiment of the disclosure is configured.

FIG. 2H illustrates a diagram for describing the bandwidth part switching operation in a serving cell in which an additional uplink according to an embodiment of the disclosure is configured.

In FIG. 2G, the uplink/downlink BWP operation is summarized in a general situation, that is, one downlink and one uplink per serving cell. However, in the NR, as described above, it is possible to simultaneously configure one downlink and two uplinks for a serving cell by configuring a SUL as an additional uplink.

In addition, in the case of the SUL, a frame structure different from that of the existing uplink may be provided, and a downlink existing as a pair may exist in association with the SUL. If the SUL is set to the LTE frequency, the downlink frequency existing in the SUL and the pair may also be the LTE frequency.

Also, it can be divided into 4 cases as follows depending on what type of SUL is configured.

In one embodiment of CASE 1 (2h-05), when the downlink 2h-10 and uplink 2h-15 of the serving cell are configured as the paired spectrum and the SUL 2h-25 is also configured as another downlink 2h-20 and paired spectrum present in the pair.

In one embodiment of CASE 2 (2h-30), when the downlink 2h-35 and uplink 2h-40 of the serving cell are configured as the paired spectrum and the SUL 2h-50 is also configured as another downlink 2h-45 and unpaired spectrum present in the pair.

In one embodiment of CASE 3 (2h-55), when the downlink 2h-60 and uplink 2h-65 of the serving cell are configured in the unpaired spectrum and the SUL 2h-75 is also configured as another downlink 2h-70 and unpaired spectrum present in the pair.

In one embodiment of CASE 4 (2h-80), when the downlink 2h-85 and uplink 2h-90 of the serving cell are configured in the unpaired spectrum and the SUL 2h-100 is also configured as another downlink 2h-95 and paired spectrum present in the pair.

The terminal can distinguish the BWP operation according four cases in which the SUL is configured. That is, the BWP operation is defined in the Paired BWP and Unpaired BWP operations depending on what the corresponding NUL and SUL operates when the downlink BWP switching is received. The Unpaired BWP operation refers to an operation of switching to the BWP with which the uplink is also associated according to the downlink BWP switching, and the paired BWP operation refers to an operation of maintaining the current uplink BWP regardless of the downlink BWP switching and performing the BWP switching only when an independent uplink BWP switching is indicated.

TABLE 5

Scenario for BWP operation when two uplinks exist

|  | Normal UL (NUL) | Supplementary UL (SUL) | BWP operation |
|---|---|---|---|
| CASE 1 | Downlink of serving cell and paired spectrum (FDD) | Another downlink and paired spectrum (FDD) | Paired BWP operation |
| CASE 2 | Downlink of serving cell and paired spectrum (FDD) | Another downlink and unpaired spectrum (TDD) | Paired BWP operation |
| CASE 3 | Downlink of serving cell and unpaired spectrum (TDD) | Another downlink and unpaired spectrum (TDD) | NUL: Unpaired BWP operation SUL: Paired BWP operation |
| CASE 4 | Downlink of serving cell and unpaired spectrum (TDD) | Another downlink and paired spectrum (FDD) | NUL: Unpaired BWP operation SUL: Paired BWP operation |

The operation in which the terminal is instructed by the uplink/downlink scheduling, that is, the BWP switching in the state in which the serving cell is configured as the SUL can be summarized in the following table.

TABLE 6

BWP switching operation when two uplinks exist

|  | Paired spectrum (CASE 1 & 2) | Unpaired spectrum (CASE 3 & 4) |
|---|---|---|
| Downlink scheduling | Instruct switching to corresponding BWP, including specific BWP index in DCI 1 for downlink scheduling => Switch to BWP indicated only by downlink BWP and maintain uplink BWP (NUL, SUL) into current configuration (Paired BWP operation) | Instruct switching to corresponding BWP, including specific BWP index in DCI 1 for downlink scheduling => Both downlink BWP and linked NUL uplink BWP (NUL) are switched to indicated BWP, and SUL maintains current uplink BWP (NUL: Unpaired BWP operation) (SUL: Paired BWP operation) |
| Uplink scheduling for NUL | Instruct switching to corresponding BWP, including specific BWP index in DCI 0 for uplink scheduling of NUL => Switch to BWP indicated only by uplink BWP of NUL and maintain downlink BWP into current configuration. Maintain SUL BWP into current configuration (Paired BWP operation) | Instruct switching to corresponding BWP, including specific BWP index in DCI 0 for uplink scheduling of NUL => Both uplink BWP of NUL and linked downlink BWP are switched to indicated BWP, and SUL maintains current uplink BWP (NUL: Unpaired BWP operation) (SUL: Paired BWP operation) |
| Uplink scheduling for SUL | Instruct switching to corresponding BWP, including specific BWP index in DCI 0 for uplink scheduling of SUL => Switch to BWP indicated only by uplink BWP of SUL and maintain downlink BWP and BWP of NUL into current configuration (DL: Paired BWP operation) (NUL: Paired BWP operation) | Instruct switching to corresponding BWP, including specific BWP index in DCI 0 for uplink scheduling of SUL => Switch to BWP indicated only by uplink BWP of SUL and maintain downlink BWP and BWP of NUL into current configuration (DL: Paired BWP operation) (NUL: Paired BWP operation) |

In addition, if the terminal of the serving cell in which the SUL is configured is operating at the third BWP and then the BWP timer (BWP-inactivityTimer) expires, the operation to make the fallback to the second BWP can be summarized by being classified into the case in which the uplink/downlink is operating in the paired spectrum and the case in which the uplink/downlink is operating in the unpaired spectrum.

For the above two cases, the BWP switching operation of the terminal when the BWP timer of the terminal expires can be summarized as shown in the table below.

TABLE 7

BWP timer expiration operation when two uplinks exist

| | Paired spectrum (CASE 1 & 2) | Unpaired spectrum (CASE 3 & 4) |
|---|---|---|
| Bwp-inactivityTimer start (BWP timer starts) | When DCI 1 for downlink scheduling is received and the corresponding DCI indicates second BWP other than third BWP, Bwp-inactivityTimer starts | When DCI 1 for downlink scheduling or DCI 0 for uplink scheduling of NUL is received and the corresponding DCI indicates second BWP other than third BWP, Bwp-inactivityTimer starts |
| Upon expiry of Bwp-inactivityTimer (BWP timer expires) | Downlink: Switch to second BWP of downlink already configured Uplink of NUL: Maintain operation in uplink BWP currently activated Uplink of SUL: Maintain operation in uplink BWP currently activated | Downlink: Switch to second BWP of downlink already configured Uplink of NUL: Switch to second BWP of uplink already configured Uplink of SUL: Maintain operation in uplink BWP currently activated |

In the case of CASE 3 and CASE 4 of the disclosure, the uplink second BWP (UL default BWP) may be one of the BWPs configured in the NUL and may have the same value as the BWP index in the downlink second BWP (DL default BWP). However, even if the uplink BWP of the SUL has the same value as the BWP index for the downlink second BWP (DL default BWP), this is not the default BWP. This is because the BWP of the SUL is not associated with the downlink BWP of the serving cell.

In the case of CASE 3 and CASE 4, that is, when the serving cell in which the SUL is configured operates as the TDD cell, the $N_{TA\ offset}$ value may be determined. In the above case, the $N_{TA\ offset}=624.64/2^\mu$ in the TAG in which the corresponding serving cell exists.

In the case of CASE 1, that is, when the serving cell in which the SUL is configured operates as the FDD cell, the $N_{TA\ offset}$ value may be determined. In the above case, if any of the serving cells present in the corresponding TAG operates in the unpaired spectrum, $N_{TA\_offset}=624.64/2^\mu$, and if all the serving cells present in the corresponding TAG operates in the paired spectrum, $N_{TA\ offset}$ is 0.

For CASE 2, the SUL may consider operating as the TDD cell (if operating in the LTE frequency, then the SUL may match the synchronization associated with other LTE uplink transmissions) in order to match the uplink synchronization. That is, the $N_{TA\ offset}$ value is not zero, and the $N_{TA\ offset}$ value in the NR may be equal to the $N_{TA\ offset}$ in the LTE.

Here, the problem is that the terminal cannot know whether the SUL is the paired spectrum (CASE 1) or the unpaired spectrum (CASE 2). Therefore, to solve this problem, the system information indicates whether the $N_{TA\ offset}$ corresponding to the SUL is 0, $N_{TA\_offset}=624.64/2^\mu$, or $N_{TA}$ offset values of the LTE. In the same sense as in the above method, the system information indicates in which of the FDD, NR TDD, or LTE TDD the SUL operates. Alternatively, the terminal sets the TAG to the longest $N_{TA\ offset}$ value among the $N_{TA\ offset}$ requesting the $N_{TA\ offset}$.

Figure 2I:
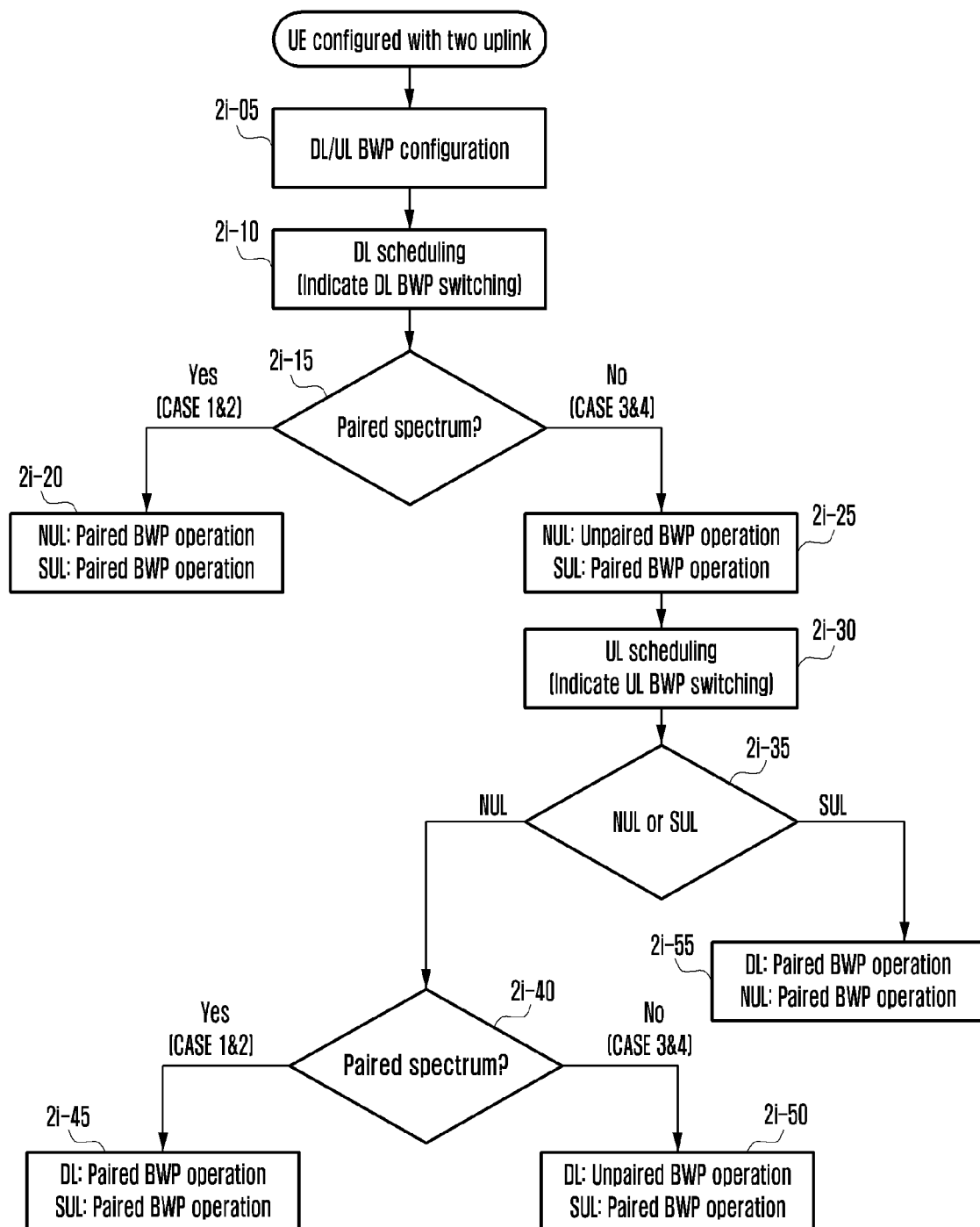
FIG. 2I illustrates a BWP switching operation in a case where two uplinks exist in an operation of a terminal according to an embodiment of the disclosure.

FIG. 2I illustrates a diagram illustrating a BWP switching operation in a case where two uplinks exist in an operation of a terminal according to an embodiment of the disclosure. This drawing is a diagram showing the summarization of the contents of Table 4 and Table 5 as described in FIG. 2H above, and the relevant description refers to the above contents.

In step 2i-05, the terminal receives the uplink/downlink BWP configuration from the base station and performs an uplink/downlink operation in a specific BWP. The above uplink BWP and downlink BWP can operate as paired or unpaired and are activated independently.

In step 2i-10, the terminal may receive the DCI on the PDCCH of the base station to receive the downlink scheduling, and the BWP index may exist to instruct the downlink BWP to be switched in the control signal. The corresponding BWP index may indicate one of the BWPs preset by the base station as an RRC control message.

In step 2i-15, the terminal performs different operations depending on whether the uplink and the downlink are currently operating in the paired spectrum. If the uplink and the downlink operate in the paired spectrum, the uplink and downlink correspond to CASE 1 and CASE 2 of Table 4 and Table 5. In step 2i-20, the terminal switches to the BWP indicated by only the downlink BWP and the uplink BWP (NUL and SUL) maintains the current configuration.

However, if the uplink and the downlink do not operate in the paired spectrum, that is, if the uplink and downlink correspond to CASE 3 and CASE 4 in Table 4 and Table 5, in step 2i-25, the terminal switches both of the downlink BWP and the linked NUL uplink BWP (NUL) to the indicated BWPs, and the SUL maintains the current uplink BWP.

Next, in step 2i-30, the terminal may receive the DCI on the PDCCH of the base station to receive the uplink scheduling, and the BWP index may exist to instruct the uplink BWP to be switched in the control signal. The indicator may be an indicator corresponding to the NUL or the SUL (2i-35). In the case of the NUL, the indicator is checked in step 2i-40 that the uplink and downlink operate in the paired spectrum. If the uplink and downlink operates in the paired spectrum, in step 2i-45, only the uplink BWP of the NUL is switched to the indicated BWP, the downlink BWP maintains the current configuration, and the BWP of the SUL also maintains the current configuration. If the uplink and downlink operate in the unpaired spectrum, both the uplink BWP of the NUL and the linked downlink BWP are switched to the indicated BWP, and the SUL maintains the current uplink BWP.

In step 2i-35, if the terminal receives the uplink scheduling of the SUL, in step 2i-55, the terminal switches to the indicated BWP only in the uplink BWP of the SUL, and the downlink BWP and the BWP of the NUL maintain the current configuration.

Figure 2J:
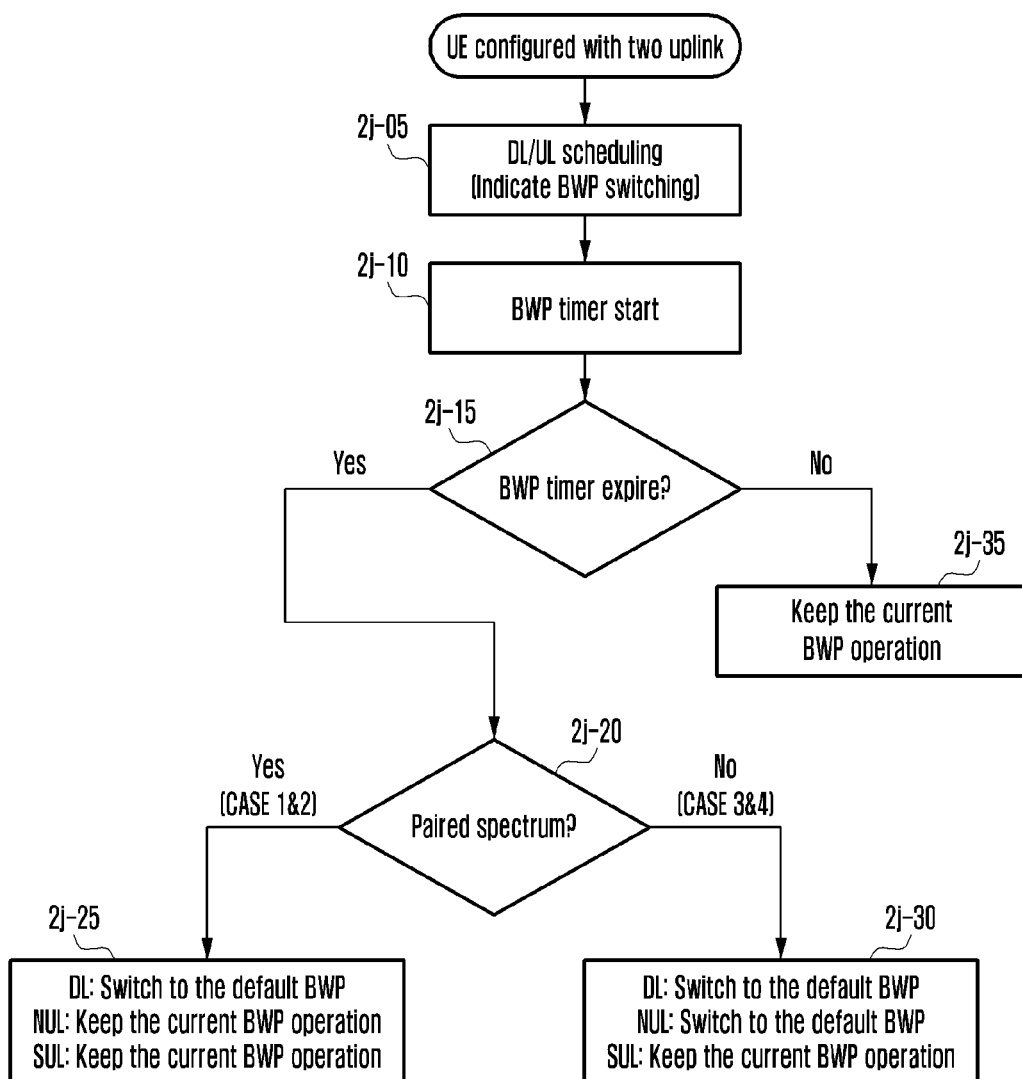
FIG. 2J illustrates a BWP timer expiration operation in a case where two uplinks exist in an operation of a terminal according to an embodiment of the disclosure.

FIG. 2J illustrates a BWP timer expiration operation in a case where two uplinks exist in an operation of a terminal according to an embodiment of the disclosure. This drawing is a diagram showing the summarization of the contents of Table 6 as described in FIG. 2H above, and the relevant description refers to the above contents.

The terminal receives the uplink/downlink BWP configuration from the base station and performs an uplink/downlink operation in a specific BWP. The above uplink BWP and downlink BWP can operate as paired or unpaired and are activated independently.

In step 2j-05, the terminal may receive the DCI on the PDCCH of the base station to receive the downlink or uplink scheduling, and the BWP index may exist to instruct the downlink BWP to be switched in the control signal. The corresponding BWP index may indicate one of the BWPs preset by the base station as an RRC control message.

Upon receiving the message, the terminal operates the BWP timer in step 2j-10. The terminal may receive the setting of the expiration time of the BWP timer in advance from the base station in the previous step.

In step 2j-15, if the BWP timer of the terminal expires, the terminal confirms whether the uplink and the downlink operate in the paired spectrum (2j-20), and in the case of the paired spectrum (CASE 1 & 2), in step 2j-25, the downlink BWP is switched to the second BWP of the downlink already configured, the uplink of the NUL maintains the operation in the currently activated uplink BWP, and the uplink of the SUL maintains the operation in the currently activated uplink BWP.

If the uplink and downlink are the unpaired spectrum (CASE 3 & 4), the downlink BWP switches to the second BWP of the downlink already configured, the uplink of the NUL switches to the second BWP of the uplink already configured, and the uplink of the SUL maintains the operation in the currently activated uplink BWP (2j-30).

In step 2j-15, if the BWP timer of the terminal does not expire, the terminal maintains the operations of the uplink and downlink BWP currently activated.

Figure 2K:
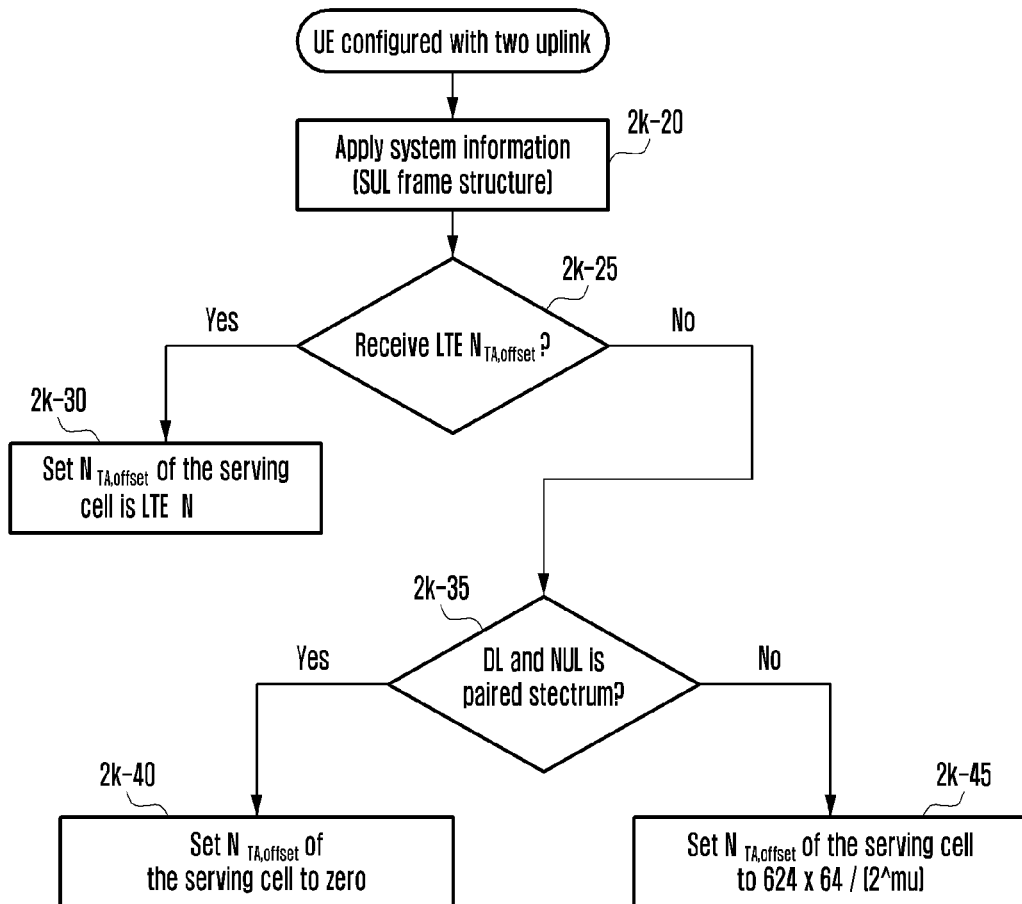
FIG. 2K illustrates an operation of the terminal according to an embodiment of the disclosure, in particular, a method for setting, by a terminal, uplink time synchronization in a serving cell where an additional uplink is configured.

FIG. 2K illustrates an operation of the terminal according to an embodiment of the disclosure, in particular, a method for setting, by a terminal, uplink time synchronization in a serving cell where an additional uplink is configured.

FIG. 2K(a) shows an operation of the terminal in a general situation in which one uplink is configured, and in particular, describes a method for determining a $N_{TA\ offset}$ value for setting uplink time synchronization. In step 2k-05, the terminal checks whether the uplink and downlink of the serving cell are operating in the paired spectrum. If the terminal operates in the paired spectrum, the terminal sets the $N_{TA\ offset}$ value to 0 in step 2k-10. However, if the terminal operates in the unpaired spectrum, the terminal sets to be $N_{TA\_offset}=624.64/2^\mu$ in step 2k-15. In the above, μ is determined according to what numerology is used in the corresponding BWP, and the detailed values thereof are summarized in Table 3.

FIG. 2K(b) shows an operation of the terminal in the case in which two uplinks are configured, that is, in the case where the SUL is additionally configured in the basic uplink and downlink, and in particular, describes a method for determining a $N_{TA\ offset}$ value for setting an uplink time synchronization. For CASE 2 in the BWP scenario, the SUL may consider operating as the TDD cell (if operating in the LTE frequency, then the SUL may match the synchronization associated with other LTE uplink transmissions) in order to match the uplink synchronization. That is, the $N_{TA\ offset}$ value is not zero, and the $N_{TA\ offset}$ value in the NR may be equal to the $N_{TA\ offset}$ value in the LTE.

Here, the problem is that the terminal cannot know whether the SUL is the paired spectrum (CASE 1) or the unpaired spectrum (CASE 2). Therefore, to solve this problem, the system information indicates whether the $N_{TA\ offset}$ corresponding to the SUL is 0, $N_{TA\_offset}=624.64/2^\mu$, or $N_{TA\ offset}$ values of the LTE.

In the same sense as in the above method, the system information indicates in which of the FDD, NR TDD, or LTE TDD the SUL operates. Alternatively, the terminal sets the TAG to the longest $N_{TA\ offset}$ value among the $N_{TA\ offset}$ requesting the $N_{TA\ offset}$. That is, in step 2k-20, the terminal applies frame structure type information of the SUL previously configured from the base station as the system information. The above information may be known again via the RRC message.

In step 2k-25, if the terminal has received the $N_{TA\ offset}$ value of the LTE from the base station, the terminal sets the $N_{TA\ offset}$ to the $N_{TA\ offset}$ value of the LTE (2k-30). If the terminal does not receive the $N_{TA\ offset}$ value of the LTE from the base station in steps 2k-25, the terminal sets the $N_{TA\ offset}$ value to 0 in the case of the paired spectrum in step 2k-40 according to whether the uplink/downlink operates in the paired spectrum (2k-35). However, if the terminal operates in the unpaired spectrum, the terminal sets to be $N_{TA\_offset}=624.64/2^\mu$ in step 2k-45. In the above, μ is determined according to what numerology is used in the corresponding BWP, and the detailed values thereof are summarized in Table 3.

Figure 2L:
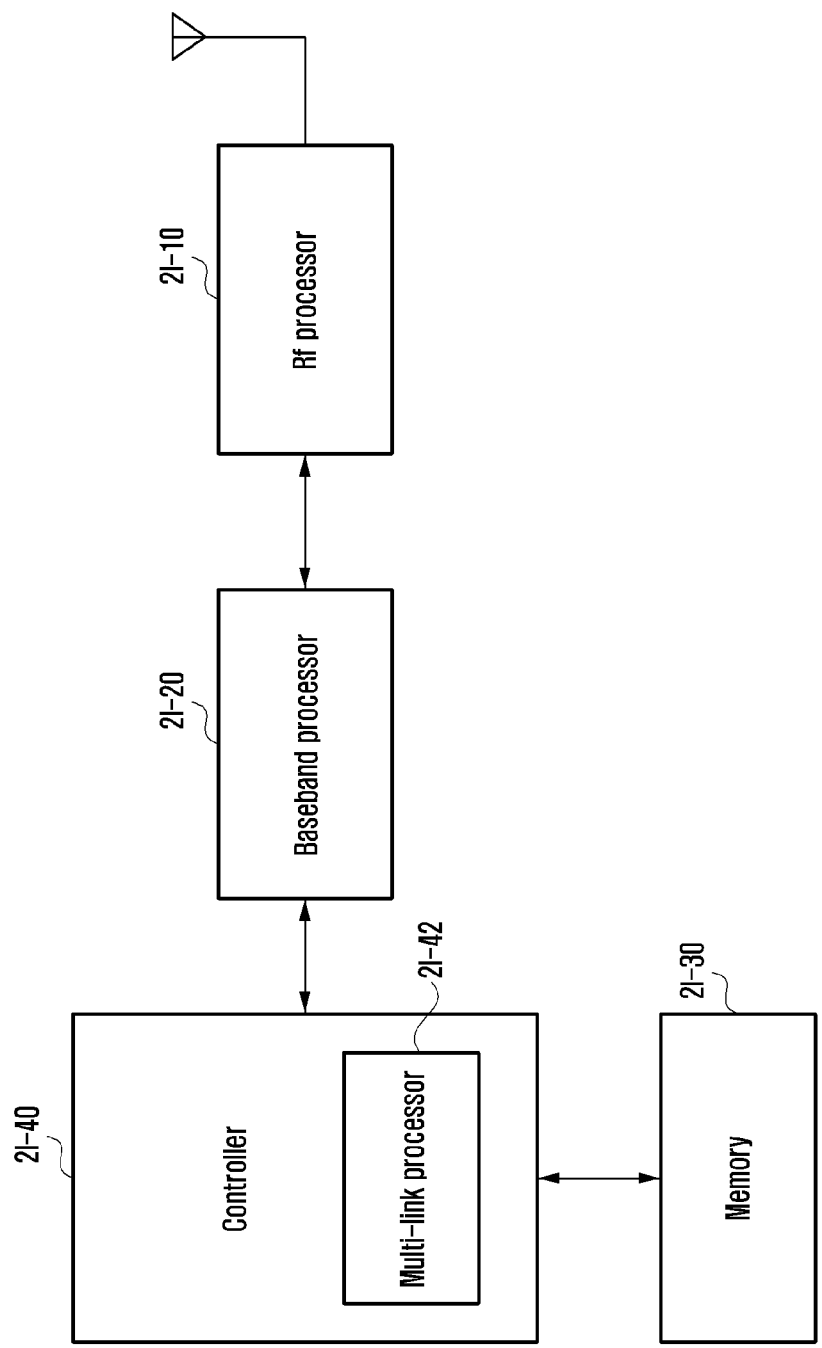
FIG. 2L illustrates a configuration of the terminal according to an embodiment of the disclosure.

FIG. 2L illustrates a configuration of the terminal according to an embodiment of the disclosure.

Referring to FIG. 2L, the terminal includes a radio frequency (RF) processor 2l-10, a baseband processor 2l-20, a memory 2l-30, and a controller 2l-40.

The RF processor 2l-10 serves to transmit/receive a signal through a radio channel, such as band conversion and amplification of a signal. That is, the RF processor 2l-10 up-converts a baseband signal provided from the baseband processor 2l-20 into an RF band signal and then transmits the RF band signal through an antenna and down-converts the RF band signal received through the antenna into the baseband signal. For example, the RF processor 2l-10 may include a transmitting filter, a receiving filter, an amplifier, a mixer, an oscillator, a digital to analog converter (DAC), an analog to digital converter (ADC), or the like.

In the above figure, only one antenna is illustrated, but the terminal may include a plurality of antennas. Further, the RF processor 2l-10 may include the plurality of RF chains. Further, the RF processor 2l-10 may perform beamforming. For the beamforming, the RF processor 2l-10 may adjust a phase and a size of each of the signals transmitted and received through a plurality of antennas or antenna elements. In addition, the RF processor may perform MIMO and may receive a plurality of layers when performing a MIMO operation.

The baseband processor 2l-20 performs a conversion function between the baseband signal and the bit string according to a physical layer standard of the system. For example, when data are transmitted, the baseband processor 2l-20 generates complex symbols by coding and modulating a transmitted bit string. Further, when data are received, the baseband processor 2l-20 recovers the received bit string by demodulating and decoding the baseband signal provided from the RF processor 2l-10. For example, according to the orthogonal frequency division multiplexing (OFDM) scheme, when data are transmitted, the baseband processor 2l-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols.

Further, when data are received, the baseband processor 2l-20 divides the baseband signal provided from the RF processor 2l-10 in an OFDM symbol unit and recovers the signals mapped to the sub-carriers by a fast Fourier transform (FFT) operation and then recovers the received bit string by the demodulation and decoding.

The baseband processor 2*l*-20 and the RF processor 2*l*-10 transmit and receive a signal as described above. Therefore, the baseband processor 2*l*-20 and the RF processor 2*l*-10 may be called a transmitter, a receiver, a transceiver, or a communication interface. Further, at least one of the baseband processor 2*l*-20 and the RF processor 2*l*-10 may include a plurality of communication modules to support a plurality of different radio access technologies.

Further, at least one of the baseband processor 2*l*-20 and the RF processor 2*l*-10 may include different communication modules to process signals in different frequency bands. For example, the different radio access technologies may include the WLAN (for example: IEEE 802.11), a cellular network (for example: LTE), or the like. Further, the different frequency bands may include a super high frequency (SHF) (for example: 2.5 GHz, 5 GHz) band, a millimeter wave (for example: 60 GHz) band.

The memory 2*l*-30 stores data such as basic programs, application programs, and configuration information or the like for the operation of the terminal. In particular, the memory 2*l*-30 may store information associated with a second access node performing wireless communication using a second radio access technology. Further, the memory 2*l*-30 provides the stored data according to the request of the controller 2*l*-40.

The controller 2*l*-40 controls the overall operations of the terminal. For example, the controller 2*l*-40 transmits/receives a signal through the baseband processor 2*l*-20 and the RF processor 2*l*-10. Further, the controller 2*l*-40 records and reads data in and from the memory 2*l*-30. For this purpose, the controller 2*l*-40 may include at least one processor. For example, the controller 2*l*-40 may include a communication processor (CP) performing a control for communication and an application processor (AP) controlling an upper layer such as the application programs.

Figure 2M:
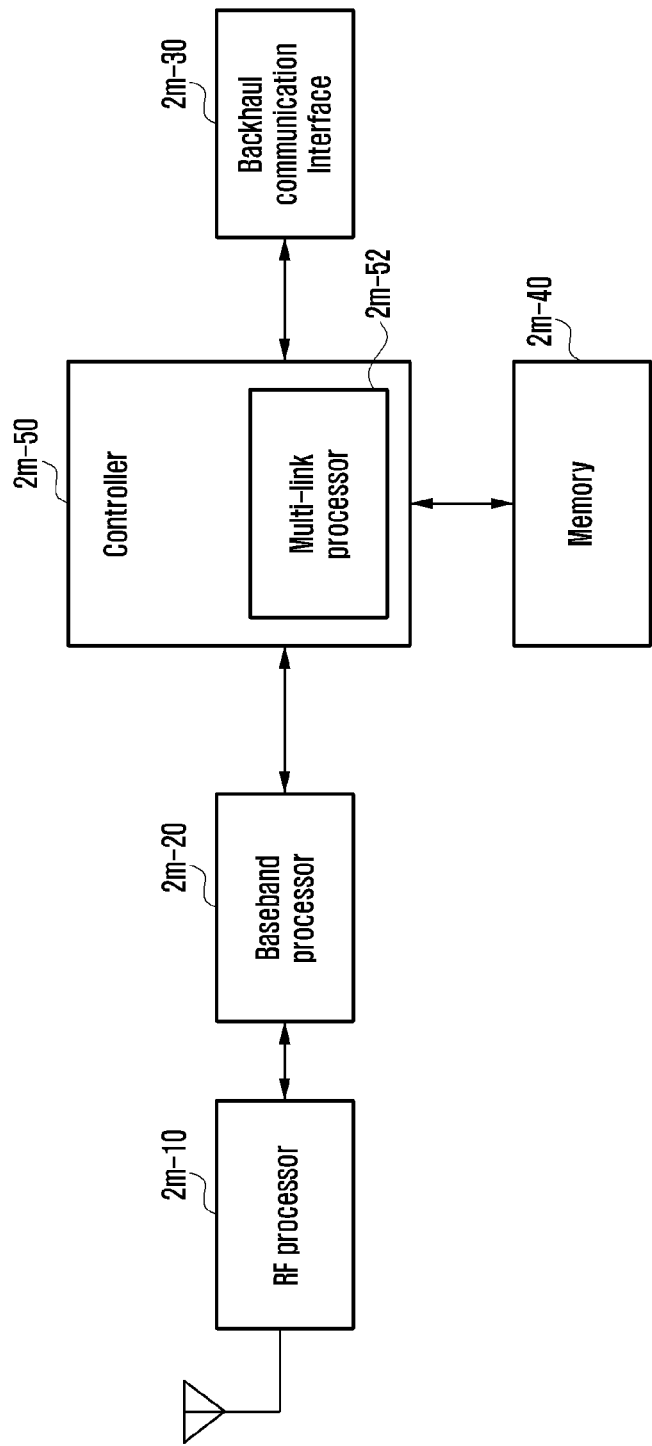
FIG. 2M illustrates a configuration of a base station according to an embodiment of the disclosure.

FIG. 2M illustrates a configuration of a base station according to an embodiment of the disclosure.

As illustrated in FIG. 2M, the base station is configured to include an RF processor 2*m*-10, a baseband processor 2*m*-20, a backhaul communication interface 2*m*-30, a memory 2*m*-40, and a controller 2*m*-50.

The RF processor 2*m*-10 serves to transmit/receive a signal through a radio channel, such as band conversion and amplification of a signal. That is, the RF processor 2*m*-10 up-converts a baseband signal provided from the baseband processor 2*m*-20 into an RF band signal and then transmits the RF band signal through an antenna and down-converts the RF band signal received through the antenna into the baseband signal. For example, the RF processor 2*m*-10 may include a transmitting filter, a receiving filter, an amplifier, a mixer, an oscillator, a DAC, an ADC, etc.

In the above figure, only one antenna is illustrated, but the first access node may include a plurality of antennas. Further, the RF processor 2*m*-10 may include the plurality of RF chains. Further, the RF processor 2*m*-10 may perform the beamforming. For the beamforming, the RF processor 2*m*-10 may adjust a phase and a size of each of the signals transmitted and received through a plurality of antennas or antenna elements. The RF processor may perform a downward MIMO operation by transmitting one or more layers.

The baseband processor 2*m*-20 performs a conversion function between the baseband signal and the bit string according to the physical layer standard of the first radio access technology. For example, when data are transmitted, the baseband processor 2*m*-20 generates complex symbols by coding and modulating a transmitted bit string. Further, when data are received, the baseband processor 2*m*-20 recovers the received bit string by demodulating and decoding the baseband signal provided from the RF processor 2*m*-10. For example, according to the OFDM scheme, when data are transmitted, the baseband processor 2*m*-20 generates the complex symbols by coding and modulating the transmitting bit string, maps the complex symbols to the sub-carriers, and then performs the IFFT operation and the CP insertion to configure the OFDM symbols.

Further, when data are received, the baseband processor 2*m*-20 divides the baseband signal provided from the RF processor 2*m*-10 in an OFDM symbol unit and recovers the signals mapped to the sub-carriers by an FFT operation and then recovers the receiving bit string by the demodulation and decoding. The baseband processor 2*m*-20 and the RF processor 2*m*-10 transmit and receive a signal as described above. Therefore, the baseband processor 2*m*-20 and the RF processor 2*m*-10 may be called a transmitter, a receiver, a transceiver, a communication interface, or a wireless communication interface.

The backhaul communication interface 2*m*-30 provides an interface for performing communication with other nodes within the network. That is, the backhaul communication interface 2*m*-30 converts bit strings transmitted from the main base station to other nodes, for example, an auxiliary base station, a core network, etc., into physical signals and converts the physical signals received from other nodes into the bit strings.

The memory 2*m*-40 stores data such as basic programs, application programs, and configuration information for the operation of the main base station. In particular, the memory 2*m*-40 may store the information on the bearer allocated to the accessed terminal, the measured results reported from the accessed terminal, etc. Further, the memory 2*m*-40 may store information that is a determination criterion on whether to provide a multiple connection to the terminal or stop the multiple connection to the terminal. Further, the memory 2*m*-40 provides the stored data according to the request of the controller 2*m*-50.

The controller 2*m*-50 controls the overall operations of the main base station. For example, the controller 2*m*-50 transmits/receives a signal through the baseband processor 2*m*-20 and the RF processor 2*m*-10 or the backhaul communication interface 2*m*-30. Further, the controller 2*m*-50 records and reads data in and from the memory 2*m*-40. For this purpose, the controller 2*m*-50 may include at least one processor.

The methods according to the embodiments described in claims or specification of the disclosure may be implemented in hardware, software, or a combination of hardware and software.

When the methods are implemented in the software, a computer readable storage medium storing at least one program (software module) may be provided. At least one programs stored in the computer readable storage medium is configured for execution by at least one processor within an electronic device. At least one program includes instructions that allow the electronic device to execute the methods according to the embodiments described in the claims or specification of the disclosure.

The program (software module, software) may be stored in a random access memory, a non-volatile memory including a flash memory, a read only memory (ROM), an electrically erasable programmable read only memory (EEPROM), a magnetic disc storage device, a compact disc- ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the disclosure through an external port. Further, a separate storage device on the communication network may also access a device performing the embodiment of the disclosure.

In the detailed embodiments of the disclosure, components included in the disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

Although the exemplary embodiments of the disclosure have been disclosed for illustrative purposes, various modifications, additions and substitutions are possible, without departing from the scope and spirit of the disclosure as disclosed in the accompanying claims. Accordingly, the scope of the disclosure is not construed as being limited to the described embodiments but is defined by the appended claims as well as equivalents thereto.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
  receiving, from a base station, system information including configuration information on a supplementary uplink (SUL) of a cell associated with the base station, and information on an offset applied for a random access on the cell, wherein an uplink (UL) of the cell and the SUL of the cell are configured for one downlink of the cell, and wherein the configuration information on the SUL of the cell includes information on a threshold;
  selecting the SUL for the random access from the UL and the SUL based on the information on the threshold and a reference signal received power (RSRP) measured for the one downlink of the cell;
  determining a transmission timing for an uplink signal for the random access to be transmitted on the SUL based on a value indicated by the information on the offset, wherein the value indicated by the information on the offset is included in a plurality of values, and wherein the plurality of the values are defined based on a duplex mode of the cell in which a transmission of the uplink signal takes place and a frequency range of the cell; and
  transmitting, to the base station, the uplink signal on the SUL based on the determined transmission timing.

2. The method of claim 1, wherein the transmission timing for the uplink signal is determined further based on a timing advance between the one downlink and the SUL.

3. The method of claim 1, wherein the value is 0, in case that the duplex mode of the cell is a frequency division duplex (FDD) mode.

4. The method of claim 1, wherein the value is 39936, in case that the duplex mode of the cell is a time division duplex (TDD) mode.

5. A method performed by a base station in a wireless communication system, the method comprising:
  transmitting, to a terminal, system information including configuration information on a supplementary uplink (SUL) of a cell associated with the base station, and information on an offset applied for a random access on the cell, wherein an uplink (UL) of the cell and the SUL of the cell are configured for one downlink of the cell, and wherein the configuration information on the SUL of the cell includes information on a threshold; and
  receiving, from the terminal, an uplink signal for the random access on the SUL of the cell based on a transmission timing,
  wherein the SUL for the random access is determined from the UL and the SUL based on the information on the threshold,
  wherein the transmission timing for the uplink signal is determined based on a value indicated by the information on the offset,
  wherein the value indicated by the information on the offset is included in a plurality of values, and
  wherein the plurality of the values are defined based on a duplex mode of the cell in which a transmission of the uplink signal takes place and a frequency range of the cell.

6. The method of claim 5, wherein the transmission timing for the uplink signal is determined further based on a timing advance between the one downlink and the SUL.

7. The method of claim 5, wherein the value is 0, in case that the duplex mode of the cell is a frequency division duplex (FDD) mode.

8. The method of claim 5, wherein the value is 39936, in case that the duplex mode of the cell is a time division duplex (TDD) mode.

9. A terminal in a wireless communication system, the terminal comprising:
  a transceiver; and
  a controller configured to:
    receive, from a base station via the transceiver, system information including configuration information on a supplementary uplink (SUL) of a cell associated with the base station, and information on an offset applied for a random access on the cell, wherein an uplink (UL) of the cell and the SUL of the cell are configured for one downlink of the cell, and wherein the configuration information on the SUL of the cell includes information on a threshold,
    select the SUL for the random access from the UL and the SUL based on the information on the threshold and a reference signal received power (RSRP) measured for the one downlink of the cell,
    determine a transmission timing for an uplink signal for the random access to be transmitted on the SUL based on a value indicated by the information on the offset, wherein the value indicated by the information on the offset is included in a plurality of values, and wherein the plurality of the values are defined based on a duplex mode of the cell in which a transmission of the uplink signal takes place and a frequency range of the cell, and transmit, to the base station via the transceiver, the uplink signal on the SUL based on the determined transmission timing.

10. The terminal of claim 9, wherein the transmission timing for the uplink signal is determined further based on a timing advance between the one downlink and the SUL.

11. The terminal of claim 9, wherein the value is 0, in case that the duplex mode of the cell is a frequency division duplex (FDD) mode.

12. The terminal of claim 9, wherein the value is 39936, in case that the duplex mode of the cell is a time division duplex (TDD) mode.

13. A base station in a wireless communication system, the base station comprising:

a transceiver; and a controller configured to:

transmit, to a terminal via the transceiver, system information including configuration information on a supplementary uplink (SUL) of a cell associated with the base station, and information on an offset applied for a random access on the cell, wherein an uplink (UL) of the cell and the SUL of the cell are configured for one downlink of the cell, and wherein the configuration information on the SUL of the cell includes information on a threshold, and receive, from the terminal via the transceiver, an uplink signal for the random access on the SUL of the cell based on a transmission timing, wherein the SUL for the random access is determined from the UL and the SUL based on the information on the threshold, wherein the transmission timing for the uplink signal is determined based on a value indicated by the information on the offset, wherein the value indicated by the information on the offset is included in a plurality of values, and wherein the plurality of the values are defined based on a duplex mode of the cell in which a transmission of the uplink signal takes place and a frequency range of the cell.

14. The base station of claim 13, wherein the transmission timing for the uplink signal is determined further based on a timing advance between the one downlink and the SUL.

15. The base station of claim 13, wherein the value is 0, in case that the duplex mode of the cell is a frequency division duplex (FDD) mode.

16. The base station of claim 13, wherein the value is 39936, in case that the duplex mode of the cell is a time division duplex (TDD) mode.

* * * * *